(12) United States Patent
Pope et al.

(10) Patent No.: US 11,968,471 B2
(45) Date of Patent: Apr. 23, 2024

(54) SLIDING WINDOW FOR IMAGE KEYPOINT DETECTION AND DESCRIPTOR GENERATION

(71) Applicant: Apple Inc., Cupertino, CA (US)

(72) Inventors: David R. Pope, Campbell, CA (US); Liran Fishel, Raanana (IL); Assaf Metuki, Moshav Herut (IL); Muge Wang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 17/195,520

(22) Filed: Mar. 8, 2021

(65) Prior Publication Data

US 2022/0286604 A1 Sep. 8, 2022

(51) Int. Cl.
*H04N 5/76* (2006.01)
*G06T 1/60* (2006.01)
*G06T 7/246* (2017.01)
*H04N 1/21* (2006.01)

(52) U.S. Cl.
CPC .............. *H04N 5/76* (2013.01); *G06T 1/60* (2013.01); *G06T 7/251* (2017.01); *H04N 1/2141* (2013.01); *G06T 2207/20016* (2013.01)

(58) Field of Classification Search
CPC . G06T 2207/20016; G06T 1/60; G06T 7/251; G06T 7/246; G06T 7/20; G06T 5/002; G06T 3/40; G06T 3/4015; G06T 1/20; G06V 30/18143; G06V 10/462; G06V 30/10; G06F 18/00; G06F 18/25;

(Continued)

(56) References Cited

U.S. PATENT DOCUMENTS 9,317,898 B2  4/2016  Pau et al.
9,959,661 B2  5/2018  Deshwal et al.
10,402,448 B2  9/2019  Filgueiras de Araujo et al.
(Continued)

OTHER PUBLICATIONS

Sun et al. "A flexible and efficient real-time orb-based full-hd image feature extraction accelerator." IEEE Transactions on Very Large Scale Integration (VLSI) Systems 28.2 (2019): 565-575 (Year: 2019).*

*Primary Examiner* — Sumati Lefkowitz
*Assistant Examiner* — Michael Adam Shariff
(74) *Attorney, Agent, or Firm* — Sterne, Kessler, Goldstein & Fox, P.L.L.C.

(57) ABSTRACT

Embodiments relate to extracting features from images, such as by identifying keypoints and generating keypoint descriptors of the keypoints. An apparatus includes a pyramid image generator circuit, a keypoint descriptor generator circuit, and a pyramid image buffer. The pyramid image generator circuit generates an image pyramid from an input image. The keypoint descriptor generator circuit processes the pyramid images for keypoint descriptor generation. The pyramid image buffer stores different portions of the pyramid images generated by the pyramid image generator circuit at different times and provides the stored portions of the pyramid images to the keypoint descriptor generator circuit for keypoint descriptor generation. When first portions of the pyramid images are no longer needed for the keypoint descriptor generation, the first portions are removed from the pyramid image buffer to provide space for second portions of the pyramid images that are needed for the keypoint descriptor generation.

20 Claims, 12 Drawing Sheets

(58) Field of Classification Search
CPC ...... G06F 17/153; H04N 1/2141; H04N 5/76; H04N 25/40; H04N 5/772
See application file for complete search history.

(56) References Cited

U.S. PATENT DOCUMENTS

| | | | |
|---|---|---|---|
| 2014/0225902 A1* | 8/2014 | Zhu | G06T 1/60 |
| | | | 345/501 |
| 2018/0268256 A1* | 9/2018 | Di Febbo | G06V 10/757 |
| 2019/0311218 A1 | 10/2019 | Smith | |
| 2020/0050880 A1* | 2/2020 | Pope | H04N 25/63 |

* cited by examiner

SLIDING WINDOW FOR IMAGE KEYPOINT DETECTION AND DESCRIPTOR GENERATION

BACKGROUND

1. Field of the Disclosure

The present disclosure relates to a circuit for processing images and more specifically to identifying and extracting points of interest in images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are implemented as a hardware component separate from the CPU and dedicated to perform one or more image processing algorithms.

SUMMARY

Embodiments relate to extracting features from images, such as by identifying keypoints and generating keypoint descriptors of the keypoints. Some embodiments include an apparatus including a pyramid image generator circuit, a keypoint descriptor generator circuit, and a pyramid image buffer connected to the pyramid image generator circuit and the keypoint descriptor generator circuit. The pyramid image generator circuit generates an image pyramid from an input image. The image pyramid includes pyramid images at different octaves and scales. The keypoint descriptor generator circuit processes the pyramid images for keypoint descriptor generation of keypoints in the pyramid images. The pyramid image buffer stores different portions of the pyramid images generated by the pyramid image generator circuit at different times. The pyramid image buffer provides first portions of the pyramid images stored in memory locations of the pyramid image buffer to the keypoint descriptor generator circuit for the keypoint descriptor generation, and removes the first portions of the pyramid images from the memory locations responsive to the first portions being no longer needed for the keypoint descriptor generation by the keypoint descriptor generator circuit. The pyramid image buffer stores second portions of the pyramid images that are needed for the keypoint descriptor generation by the keypoint descriptor generator circuit in the memory locations that previously stored the first portions of the pyramid images.

Some embodiments include a method for generating keypoint descriptors of keypoints. A pyramid image generator circuit generates an image pyramid from an input image. The image pyramid includes pyramid images at different octaves and scales. A keypoint descriptor generator circuit processes the pyramid images for keypoint descriptor generation of keypoints in the pyramid images. A pyramid image buffer stores different portions of the pyramid images generated by the pyramid image generator circuit at different times. The pyramid image buffer provides first portions of the pyramid images stored in memory locations of the pyramid image buffer to the keypoint descriptor generator circuit for the keypoint descriptor generation, and removes the first portions of the pyramid images from the memory locations responsive to the first portions being no longer needed for the keypoint descriptor generation by the keypoint descriptor generator circuit. The pyramid image buffer stores second portions of the pyramid images that are needed for the keypoint descriptor generation by the keypoint descriptor generator circuit in the memory locations that previously stored the first portions of the pyramid images.

Some embodiments include a system including an image sensor and an image signal processor connected to the image sensor. The image signal processor includes a pyramid image generator circuit, a keypoint descriptor generator circuit, and a pyramid image buffer connected to the pyramid image generator circuit and the keypoint descriptor generator circuit. The pyramid image generator circuit generates an image pyramid from the input image. The image pyramid includes pyramid images at different octaves and scales. They keypoint descriptor generator circuit processes the pyramid images for keypoint descriptor generation of keypoints in the pyramid images. The pyramid image buffer stores different portions of the pyramid images generated by the pyramid image generator circuit at different times. The pyramid image buffer provides first portions of the pyramid images stored in memory locations of the pyramid image buffer to the keypoint descriptor generator circuit for the keypoint descriptor generation, and removes the first portions of the pyramid images from the memory locations responsive to the first portions being no longer needed for the keypoint descriptor generation by the keypoint descriptor generator circuit. The pyramid image buffer stores second portions of the pyramid images that are needed for the keypoint descriptor generation by the keypoint descriptor generator circuit in the memory locations that previously stored the first portions of the pyramid images.

Figure 1:
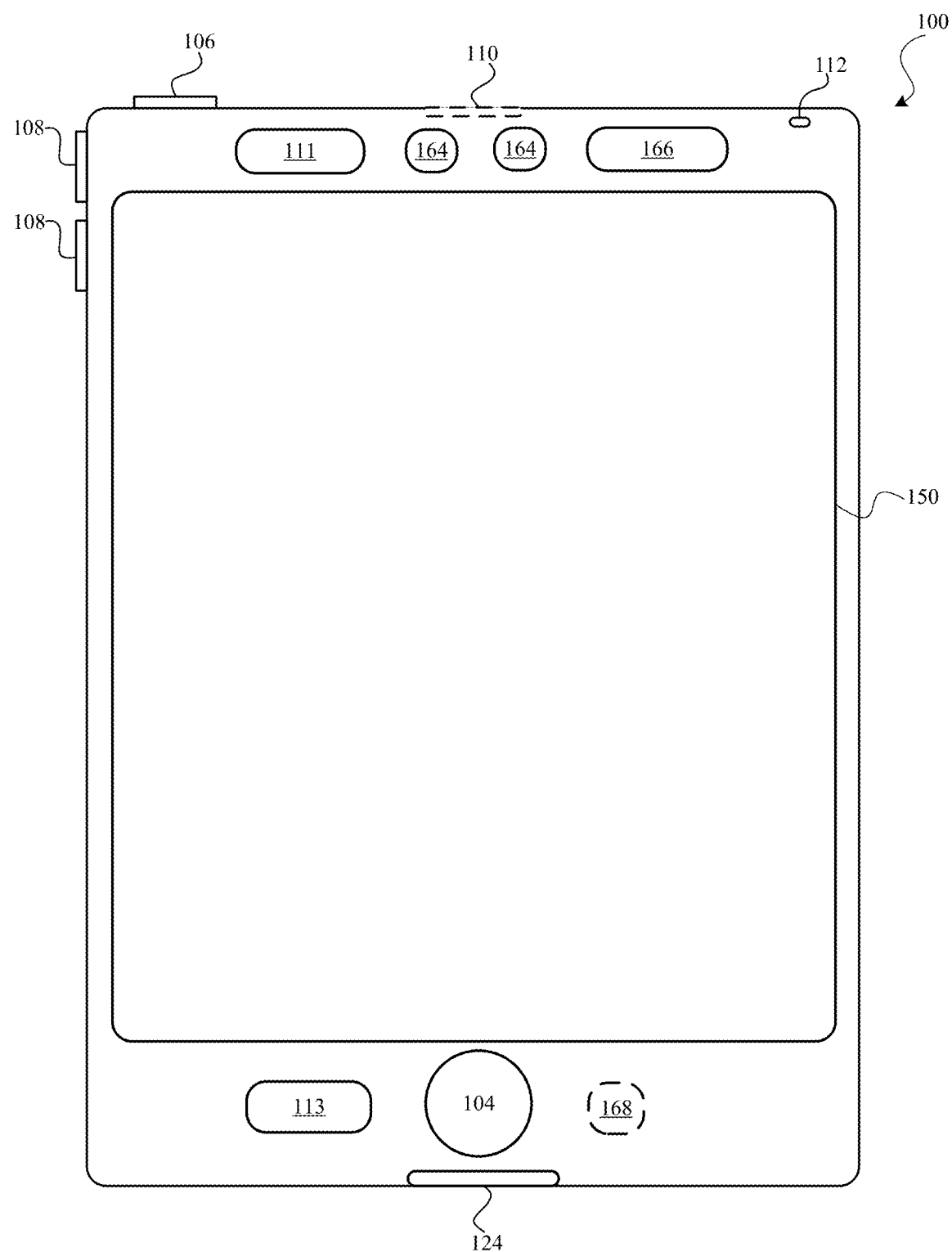
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to circuitry for determining keypoints in images and generating keypoint descriptors. The circuitry uses a multi-stage process to generate the keypoint descriptors that includes stages of generating an (e.g., gaussian) image pyramid, generating a response map (RM) image for each of the pyramid images and determining keypoint candidates using an intra octave processing that compares RM images of the same octave, determining keypoints from the keypoint candidates using an inter octave processing that compares RM images in different octaves and performing a sub-pixel refinement on the keypoints using interpolation, and generating keypoint descriptors of the keypoints. In the stage of generating the keypoint descriptors of the keypoints, a pyramid image buffer stores the pyramid images and provides the stored pyramid images to a keypoint descriptor generator circuit that process the pyramid images for the keypoint descriptor generation of keypoints in the pyramid images. In the stage of determining keypoints from the keypoint candidates, a RM buffer stores the RM images and provides the stored RM images to a keypoint selector circuit for the keypoint determination.

Rather than using a sequential processing for these stages and waiting for each stage to complete before beginning the next stage, the circuitry uses a sliding window mechanism where processing for subsequent stages begin when enough data from the prior stage has been generated. Keypoint descriptor generation is performed on different portions of the pyramid images at different times, and the pyramid image buffer stores different portions of the pyramid images at different times to facilitate the keypoint descriptor generation. Portions (e.g., lines) of the pyramid images that have been processed for keypoint descriptor generation and are no longer needed are removed from the memory locations of the pyramid image buffer, and other portions of the pyramid images that need to be processed for the keypoint descriptor generation are stored in the memory locations of the pyramid image buffer.

Similarly, keypoint determination is performed on different portions of the RM images at different times, and the RM buffer stores different portions of the RM images at different times to facilitate the keypoint determination. Portions of the RM images that have been processed for keypoint determination and are no longer needed are removed from memory locations of the RM buffer, and other portions of the RM images that need to be processed for the keypoint determination are stored in the memory locations of the RM buffer.

Using the sliding window mechanism, the pyramid image buffer obviates the need to store the entire image pyramid at one time and the RM buffer does not need to store the entire corresponding set of RM images at one time. As such, the required memory sizes of the pyramid image buffer and the RM buffer, which may be static random-access memory (SRAM) located on the same chip as the processing circuitry, are reduced.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
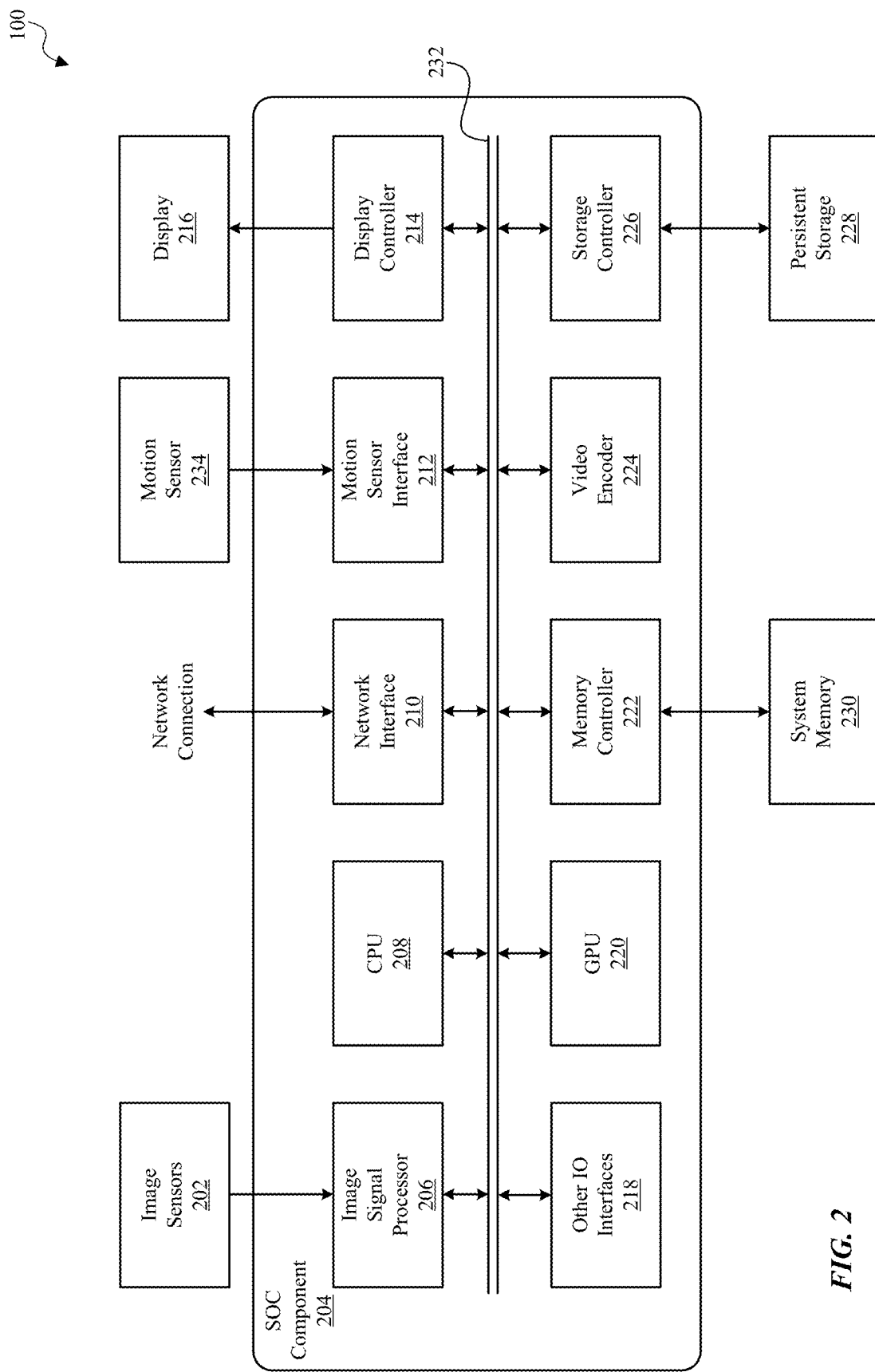
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
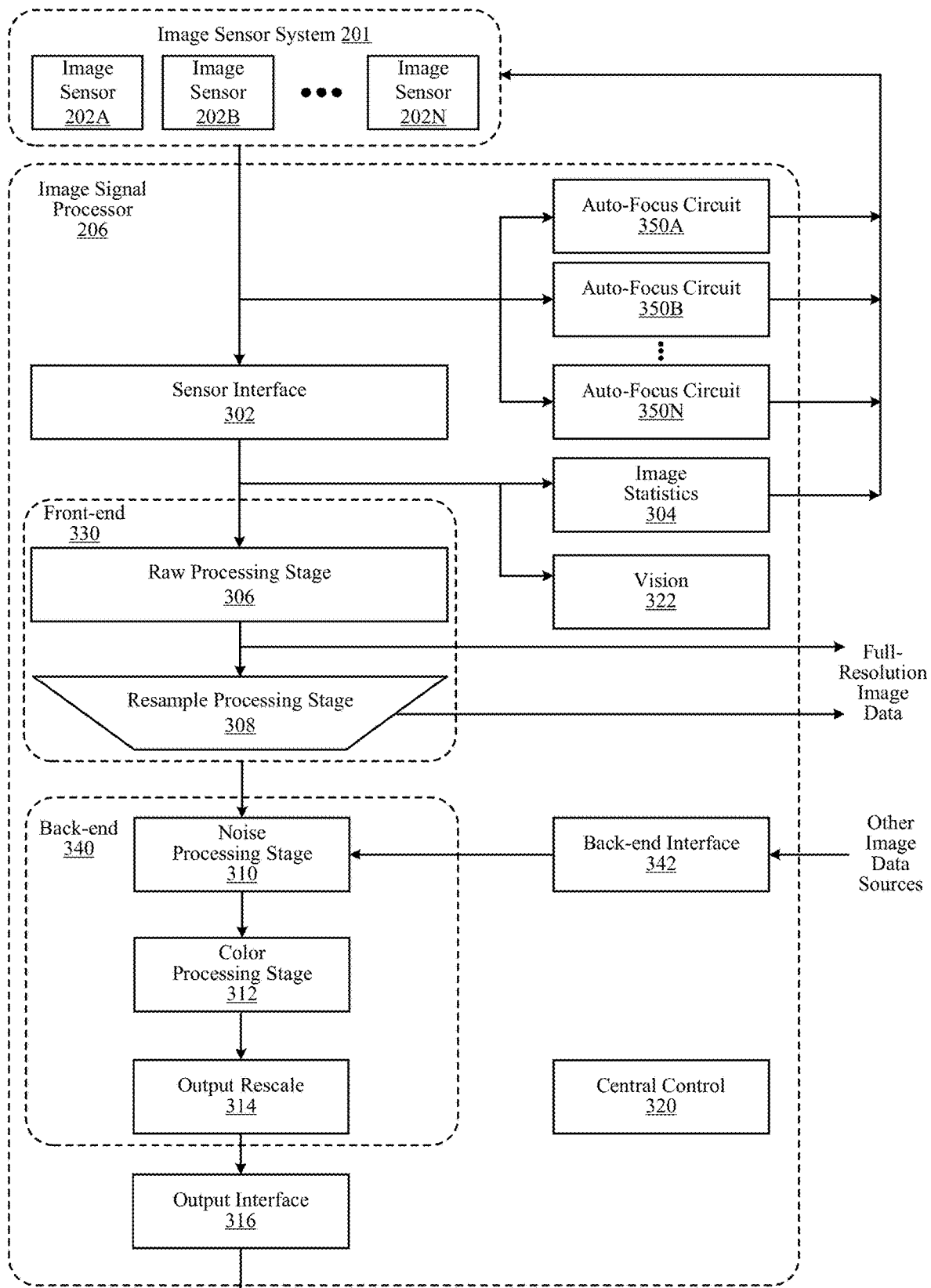
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include focus pixels that are used for auto-focusing and image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
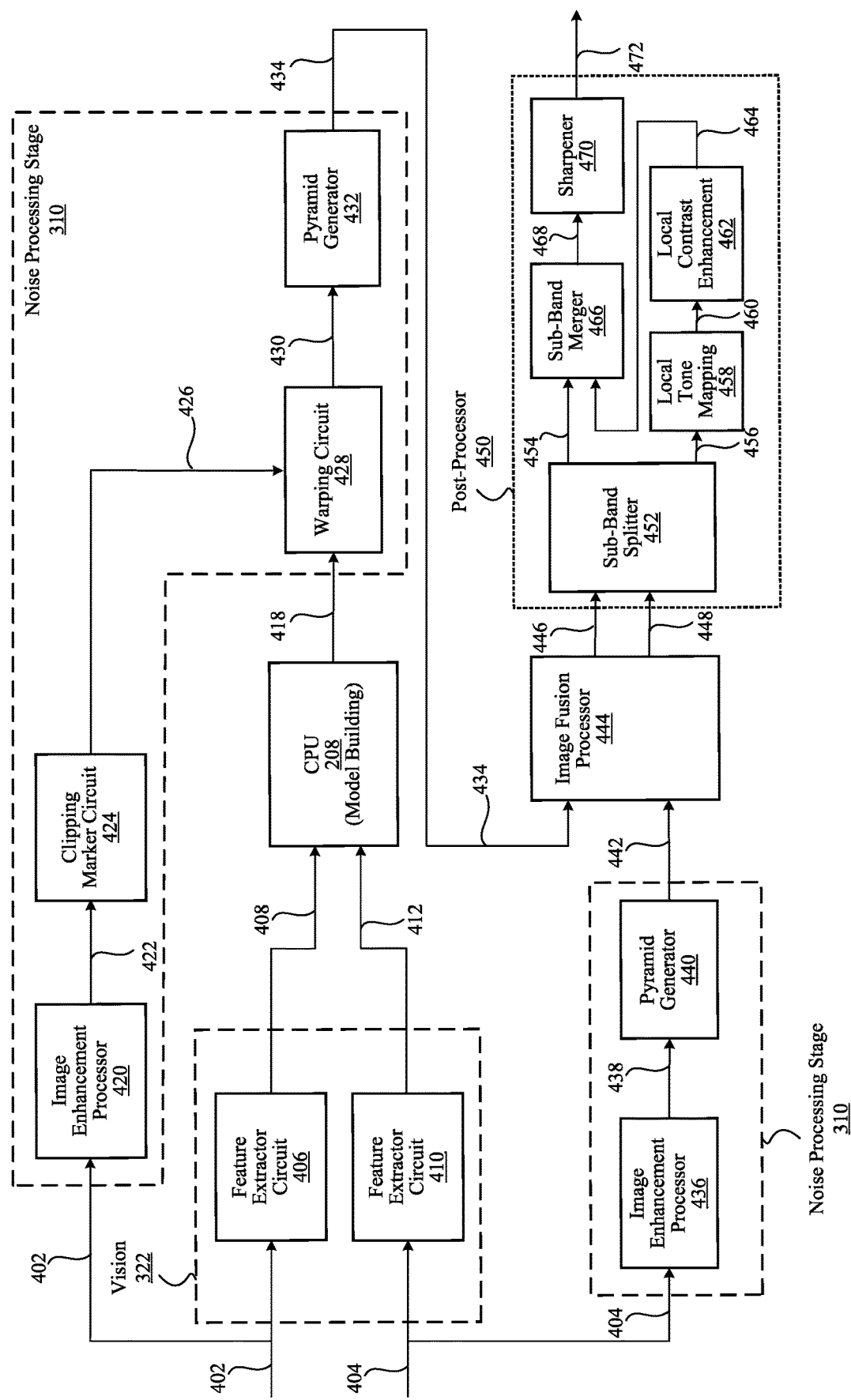
FIG. 4 is a block diagram illustrating a portion of the image processing pipeline including circuitry for feature extraction, according to one embodiment.

FIG. 4 is a block diagram illustrating a portion of the image processing pipeline including circuitry for feature extraction, according to one embodiment. Images 402, 404 are captured by image sensor system 201 and passed onto vision module 322. In one embodiment, image 402 is captured shortly before or after capturing image 404. Alternatively, images 402 and 404 are captured at the same time using two different image sensors 202 with different exposure times. Image 402 captures a scene with a first exposure time, and image 404 captures the same scene with a second exposure time that may be different than the first exposure time. If the second exposure time is shorter than the first exposure time, image 402 can be referred to as "long exposure image" and image 404 can be referred to as "short exposure image." Each image 402, 404 includes multiple color components, e.g., luma and chroma color components. Image 402 is passed onto feature extractor circuit 406 of vision module 322 for processing and feature extraction. Image 404 may be passed onto feature extractor circuit 410 of vision module 322 for processing and feature extraction. Alternatively, feature extractor circuit 410 may be turned off.

Feature extractor circuit 406 extracts first keypoint information 408 about first keypoints (e.g., salient points) in image 402 by processing pixel values of pixels in image 402. The first keypoints are related to certain distinguishable features (also referred to "salient points") in image 402. Extracted first keypoint information 408 can include information about spatial locations (e.g., coordinates) of at least a subset of pixels in image 402 associated with the first keypoints of image 402. For each of the first keypoints in image 402, feature extractor circuit 406 may also extract and encode a keypoint descriptor, which includes a keypoint scale and orientation information. Thus, first keypoint information 408 extracted by feature extractor circuit 406 may include information about a spatial location of each of the first keypoints of image 402 and a keypoint descriptor of each of the first keypoints of image 402. First keypoint information 408 associated with at least the subset of pixels of image 402 is passed onto CPU 208 for processing.

Feature extractor circuit 410 extracts second keypoint information 412 about second keypoints in image 404 by processing pixel values of pixels in image 404. The second keypoints are related to certain distinguishable features (e.g., salient points) in image 404. Extracted second keypoint information 412 can include information about spatial locations (e.g., coordinates) of at least a subset of pixels in image 404 associated with the second keypoints of image 404. For each of the second keypoints in image 404, feature extractor circuit 410 may also extract and encode a keypoint descriptor, which includes a keypoint scale and orientation information. Thus, second keypoint information 412 extracted by feature extractor circuit 410 may include information about a spatial location of each of the second keypoints of image 404 and a keypoint descriptor of each of the second keypoints of image 404. Second keypoint information 412 associated with at least the subset of pixels of image 404 are passed onto CPU 208 for processing. Alternatively (not shown in FIG. 4), feature extractor circuit 410 is turned off In such case, second keypoints of image 404 are not extracted and only first keypoint information 408 is passed onto CPU 208 for processing.

CPU 208 builds a model describing correspondence between image 402 and image 404. CPU 208 searches for correspondences between first keypoint information 408 of image 402 and second keypoint information 412 of image 404 to generate at least one motion vector representing relative movement in image 402 and image 404. In one embodiment, CPU 208 correlates (matches) first keypoint information 408 with second keypoint information 412, e.g., by comparing and pairing keypoint descriptors extracted from images 402 and 404 to determine a set of keypoint information matches, such as pairs of keypoint descriptors extracted from images 402 and 404. CPU 208 then performs a model fitting algorithm by processing the determined set of keypoint information matches to build the model. The model fitting algorithm may be designed to discard false matches during the model building process. The model fitting algorithm may be based on, e.g., the iterative random sample consensus (RANSAC) algorithm. The model built by CPU 208 includes information about mapping between pixels in the images 402 and 404. The model may represent a linear, affine and perspective transformation. Alternatively, the model may be a non-linear transformation. Based on the model, warping parameters (mapping information) 418 may be generated by CPU 208 and sent to warping circuit 428 for spatial transformation of image 402 and/or image 404. Warping parameters 418 can be used in a form of a matrix for spatial transformation (e.g., warping) of image 402 and/or image 404. The matrix for spatial transformation represents a geometric transformation matrix or a mesh grid with motion vectors defined for every grid point. Alternatively, a dedicated circuit instead of CPU 208 may be provided to perform the RANSAC algorithm and to generate warping parameters 418.

In the embodiment when feature extractor circuit 410 is turned off and only first keypoint information 408 is passed onto CPU 208, CPU 208 generates a motion vector for each of the first keypoints of image 402. This is done by performing, e.g., the NCC search within an expected and configurable displacement range to determine a best feature match within a defined spatial vicinity (patch) of each first keypoint of image 402. In such case, CPU 208 performs a model fitting algorithm (e.g., the RANSAC algorithm) that uses first keypoint information 408 (e.g., coordinates of the first keypoints) and corresponding motion vectors determined based on feature matches to build a model, whereas matching of keypoints between images 402 and 404 is not performed. The model fitting algorithm may be designed to discard false feature matches. Based on the built model, CPU 208 generates warping parameters (mapping information) 418 that is sent to warping circuit 428 for spatial transformation of image 402. Alternatively, a dedicated circuit instead of CPU 208 may be provided to perform the NCC search and to generate a motion vector for each of the first keypoints of image 402. In such case, CPU 208 uses the motion vector for each of the first keypoints generated by the dedicated circuit to build the model.

Image 402, which may be a long exposure image, is also passed onto image enhancement processor 420 that performs certain processing of image 402, e.g., noise removal, enhancement, etc., to obtain processed version 422 of image 402. Processed version 422 is passed onto clipping marker circuit 424. Clipping marker circuit 424 identifies clipped (e.g., oversaturated) pixels in processed version 422 of image 402 having one or more color component values that exceed threshold values as clipping markers. Clipping marker circuit 424 may replace the pixel values with predetermined pixel values so that any of these pixels or any other pixel derived from these pixels downstream from clipping marker circuit 424 can be identified and addressed appropriately in subsequent processing, such as corresponding morphological operations (e.g., erosion or dilation) of the clipping markers. For example, the morphological operations can be conducted during a warping operation performed by warping circuit 428, during a pyramid generation performed by pyramid generator circuit 432, and/or during a fusion operation performed by image fusion processing module 444.

Warping circuit 428 accommodates the linear and non-linear transformations defined by the model generated by CPU 208. Warping circuit 428 warps processed image 426 using the mapping information according to the warping parameters 418 to generate warped version 430 of image 402 (warped image 430) spatially more aligned to image 404 than to image 402. Alternatively (not shown in FIG. 4), warping circuit 428 warps image 404 using the mapping information in model 418 to generate warped version 430 of image 404 spatially more aligned to image 402 than to image 404. Warped image 430 generated by warping circuit 428 is then passed onto pyramid generator circuit 432.

Pyramid generator circuit 432 generates multiple downscaled warped images each having a different resolution by sequentially downscaling warped image 430. Each downscaled warped image includes the multiple color components. The downscaled warped images obtained from warped image 430 may be stored in e.g., system memory 230 (not shown in FIG. 4). Low frequency components of the downscaled warped images and a low frequency component of an unscaled single color version (e.g., luma component) of warped image 430 are passed as warped image data 434 onto image fusion processing circuit 444 for fusion with corresponding image data 442 obtained from image 404. Note that in some embodiments, image enhancement processor 420, clipping locator circuit 424, warping circuit 428, and pyramid generator circuit 432 are part of noise processing stage 310. In some embodiments, one or more of image enhancement processor 420, clipping locator circuit 424, warping circuit 428, and pyramid generator circuit 432 are outside of noise processing stage 310, such as in another stage of back-end pipeline stages 340.

Image enhancement processor 436 performs certain processing of image 404 (e.g., noise removal, enhancement, etc.) to obtain processed image 438 for passing onto pyramid generator circuit 440. Image enhancement processor 436 may perform substantially same operations as image enhancement processor 420. Pyramid generator circuit 440 generates multiple downscaled images each having a different resolution by sequentially downscaling processed image 438. Each downscaled image generated by pyramid generator circuit 440 includes the multiple color components (e.g., luma and chroma components). The downscaled images obtained from processed image 438 may be stored in, e.g., system memory 230. Low frequency components of the downscaled images and a low frequency component of an unscaled single color version (e.g., luma component) of processed image 438 are passed onto image fusion processing circuit 444 as image data 442. Note that in some embodiments, image enhancement processor 436 and pyramid generator circuit 440 are part of noise processing stage 310. In some embodiments, at least one of image enhancement processor 436 and pyramid generator circuit 440 is outside of noise processing stage 310, such as in another stage of back-end pipeline stages 340.

Image fusion processing circuit 444 performs per pixel blending between a portion of warped image data 434 related to the unscaled single color version of warped image 430 with a portion of image data 442 related to the unscaled single color version of processed image 438 to generate unscaled single color version of fused image 446. Image fusion processing circuit 444 also performs per pixel blending between a portion of warped image data 434 related to a downscaled warped image (obtained by downscaling warped image 430) and a portion of image data 442 related to a corresponding downscaled image (obtained by downscaling processed image 438) to generate first downscaled version 448 of the fused image comprising the multiple color components. First downscaled version 448 has a pixel resolution equal to a quarter of a pixel resolution of unscaled single color version 446. Unscaled single color version 446 and first downscaled version 448 are passed onto post-processing circuit 450 for further processing and enhancement.

Post-processing circuit 450 performs post-processing of unscaled single color version 446 and first downscaled version 448 to obtain post-processed fused image 472. Post-processing circuit 450 may be part of color processing stage 312. Post-processing circuit 450 includes sub-band splitter (SBS) circuit 452, local tone mapping (LTM) circuit 458, local contrast enhancement (LCE) circuit 462, sub-band merger (SBM) circuit 466 and sharpening circuit 470. SBS circuit 452 performs sub-band splitting of unscaled single color version 446 to generate high frequency component of unscaled single color version 454 passed onto SBM circuit 466. SBS circuit 452 also performs sub-band splitting of first downscaled version 448 to generate low frequency component of first downscaled version 456 passed onto LTM circuit 458. LTM circuit 458 performs LTM operation on low frequency component of first downscaled version 456 to generate processed version of low frequency component of first downscaled version 460 passed onto LCE circuit 462. LCE circuit 462 performs local photometric contrast enhancement of a single color component (e.g., luma component) of processed version of low frequency component of first downscaled version 460 to generate enhanced version of first downscaled version of fused image 464. SBM circuit 466 merges high frequency component of unscaled single color version 454 and enhanced version of first downscaled version of fused image 464 to generate merged fused image data 468 passed onto sharpening circuit 470. Sharpening circuit 470 performs sharpening (e.g., photometric contrast enhancement) on a single color component (e.g., luma component) of merged fused image data 468 to generate post-processed fused image 472. Post-processed fused image 472 can be passed to output rescale 314 and then output interface 316. The post processing performed at post-processing circuit 450 is merely an example, and various other post-processing may be performed as an alternative or as an addition to the processing at post processing circuit 450.

Example Architecture for Keypoint Descriptor Processing

Figure 5:
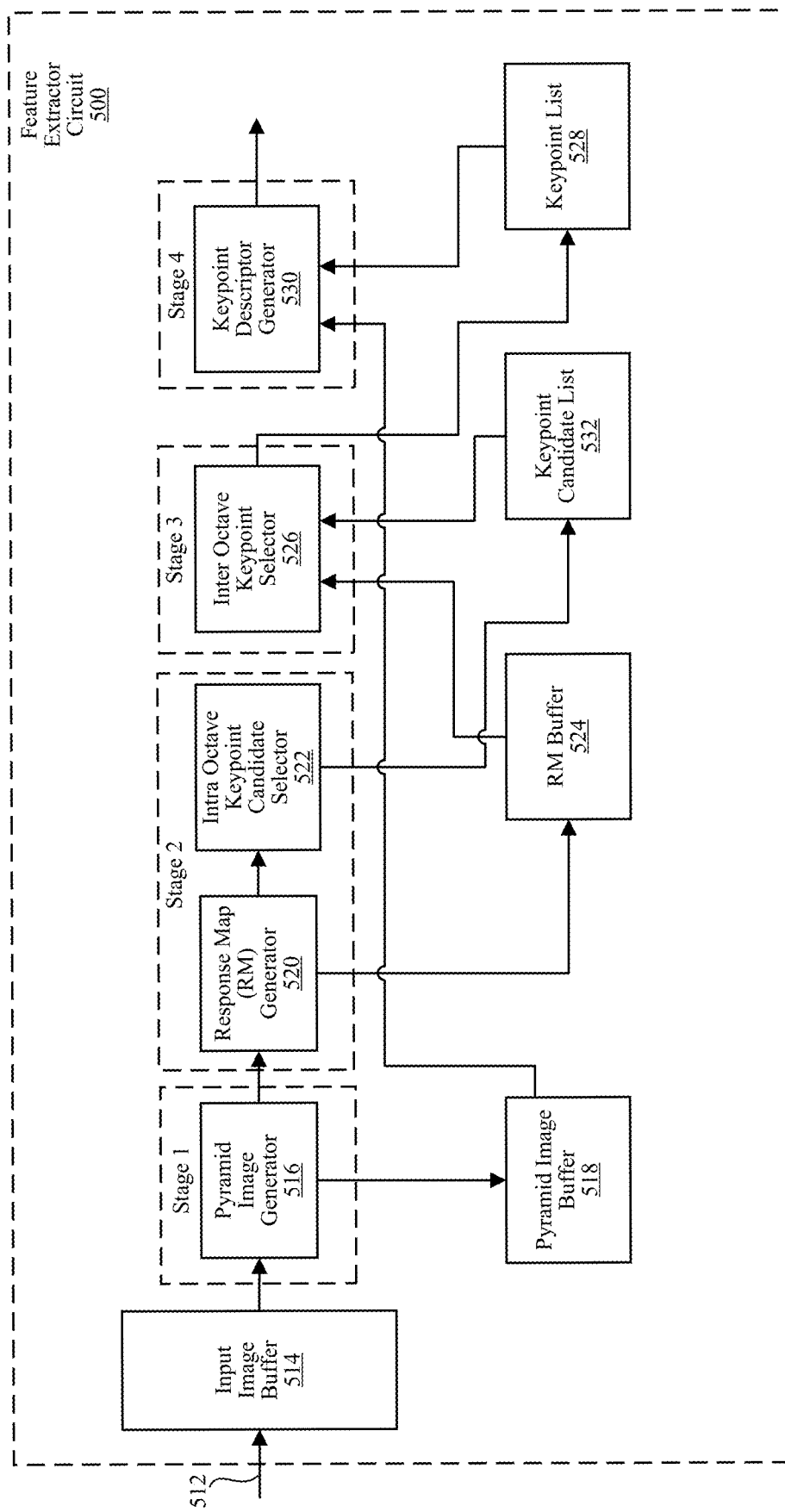
FIG. 5 is a block diagram of a feature extractor circuit, according to one embodiment.

FIG. 5 is a block diagram of a feature extractor circuit 500, according to one embodiment. The feature extractor circuit 500 is an example of a feature extractor circuit 406 or 410 of the vision module 322, or the feature extractor circuit 500 may be separate from the vision module 322. The feature extractor circuit 500 performs a multi-stage process to generate keypoint descriptors of an image 512. In stage 1, the feature extractor circuit 500 generates an image pyramid including multiple octaves and multiple scales per octave from the received image 512. Pyramid images in different octaves have different resolutions, and pyramid images in the same octave but different scale have the same resolution with different amounts of blurring. In stage 2, the feature extractor circuit 500 generates a response map (RM) image for each of the pyramid images and determines keypoint candidates using an intra octave processing that compares RM images of the same octave. In stage 3, the feature extractor circuit 500 determines keypoints from the keypoint candidates using an inter octave processing that compares RM images in different octaves. The feature extractor circuit 500 also performs a sub-pixel refinement where the x, y, or scale values of each keypoint may be updated using pixel value interpolation. In stage 4, the feature extractor circuit 500 generates keypoint descriptors of the identified keypoints. The keypoint descriptor of a keypoint includes descriptor comparison data defining comparison results between the intensity values of sample points of the keypoint.

The feature extractor circuit 500 may include, among other components, a pyramid image generator 516, an RM generator 520, an intra octave keypoint candidate selector 522, an inter octave keypoint selector 526, and a keypoint descriptor generator 530. These circuits are the processing circuitry for the stages 1 through 4. The feature extractor circuit 500 also includes one or more memories (e.g., static random-access memory (SRAM)) including a pyramid image buffer 518, an RM buffer 524, a keypoint candidate list 532, and a keypoint candidate list 528. To facilitate fast and efficient processing, the one or more memories may be located on the same IC chip as the processing circuitry of the feature extractor circuit 500.

The feature extractor circuit 500 may use a sliding window mechanism where processing for subsequent stages begin when enough data from the prior stage has been generated. Keypoint descriptor generation is performed on different portions of the pyramid images at different times, and the pyramid image buffer 518 stores different portions of the pyramid images at different times to facilitate the keypoint descriptor generation. Portions (e.g., lines) of the pyramid images that have been processed for keypoint descriptor generation and are no longer needed are removed from the memory locations of the pyramid image buffer 518, and other portions of the pyramid images that need to be processed for the keypoint descriptor generation are loaded onto the memory locations of the pyramid image buffer 518. At any given time, the pyramid image buffer 518 does not need to store full pyramid images of the image pyramid, and stores portions of the full pyramid images. The pyramid image buffer 518 may have a storage size that is smaller than a data size of the image pyramid.

Similarly, keypoint determination is performed on different portions of the RM images at different times, and the RM buffer 524 stores different portions of the RM images at different times to facilitate the keypoint determination. Portions of the RM images that have been processed for keypoint selection and are no longer needed are removed from memory locations of the RM buffer 524, and other portions of the RM images that need to be processed for the keypoint determination are loaded onto the memory locations of the RM buffer 524. At any given time, the RM buffer 524 does not need to store full RM images. The RM buffer 524 may have a storage size that is smaller than a data size of all RM images.

The input image buffer 514 is a circuit that receives and stores the image 512 for processing by the other components of the feature extractor circuit 500. In some embodiments, the input image buffer 514 is separate from the feature extractor circuit 500.

The pyramid image generator 516 is a circuit that receives image data of the image 512 from the input image buffer 514 and generates the image pyramid by repeatedly applying smoothing and downscaling functions. The image pyramid includes multiple octaves, with each octave including multiple scales. The image pyramid includes an image (referred to as a "pyramid image") for each scale. Downscaling reduces the image size for different octaves, and different amounts of smoothing is used to produce different scales within each octave. In one example, the image pyramid includes five octaves and two scales for each octave. In some embodiments, the image pyramid is Laplacian pyramid, steerable pyramid, or some other type of image pyramid. Additional details regarding stage 1 processing by the pyramid image generator 516 are discussed in connection with FIG. 6.

The pyramid image buffer 518 is a memory circuit that stores the image data of the image pyramid generated by the pyramid image generator 516. Rather than storing the entire image pyramid at one time, the pyramid image buffer 518 stores only portions of the image data for the keypoint descriptor generation of the stage 4 processing. The portions of the image pyramid stored in the image buffer 518 at any one time may include only some of the pixel lines of each pyramid image. The stage 4 processing for keypoint descriptor generation can begin as soon as enough portions of the image data are stored in the pyramid image buffer 518. Portions of the image pyramid that are no longer needed for the keypoint descriptor generation are removed from the pyramid image buffer 51 to provide space for other portions that have not been processed for keypoint descriptor generation.

The RM generator 520 is a circuit that receives the image data of the pyramid images and generates RM image data using the image data of the pyramid images received from the pyramid image generator 516. For each pyramid image, the RM generator 520 generates a corresponding RM image of the same pixel size. Each pixel of a RM image includes a response value. To determine the response values of a RM image, the RM generator 520 applies Laplacian filters (e.g., a 1×3 Laplacian filter followed by a 3×1 Laplacian filter) to the image data of the corresponding pyramid image. The RM generator 520 then determines response values RM of the RM image using the Laplacian filtered results. Rather than waiting for complete pyramid images, the RM generator 520 can begin to generate RM images when enough lines (e.g., 3 lines for the Laplacian filter) of the corresponding pyramid images are loaded onto the pyramid image buffer 518.

The intra octave keypoint candidate selector 522 is a circuit that determines keypoint candidates and partially validates the keypoint candidates by performing intra octave non-maxima suppression (NMS). While the RM generator 520 generates line n of an RM image, the intra octave keypoint candidate selector 522 finds keypoint candidates in line n−1 (e.g., the previously generated line of the RM image). A keypoint candidate is found by passing the following criteria: (1) the absolute value of an RM pixel is greater than a threshold value, (2) the RM pixel value is a local minimum or a local maximum (NMS) in a surrounding 2×3×3 pixel box, and optionally (3) the RM pixel passes a determinant criterion. For each keypoint candidate, the intra octave keypoint candidate selector 522 generates keypoint parameters including x and y image locations (defined in the original image resolution), a scale value s defining the scale of the keypoint candidate, and an RM value defining the RM pixel value of the keypoint candidate. Additional details regarding stage 2 processing by the RM generator 520 and intra octave keypoint candidate selector 522 are discussed in connection with FIG. 7.

The RM buffer 524 is a memory that stores the RM image data of the RM images generated by the RM generator 520. Rather than storing entire RM images at one time, the RM buffer 524 stores portions of the RM images data needed for keypoint determination of the stage 3 processing. The portions of the RM images stored in the RM buffer 524 at any one time may include only some pixel lines of each RM image. The stage 3 processing for keypoint determination can begin as soon as enough portions of the image data are loaded onto the RM buffer 524. Portions of the RM images that are no longer needed for the keypoint determination are removed from the RM buffer 524 to provide space for other portions that are still to be processed for the keypoint determination.

The keypoint candidate list 532 is a memory circuit that stores the keypoint candidates determined by the intra octave keypoint candidate selector 522. Each scale may include keypoint candidates. Each keypoint candidate is defined by the keypoint parameters, which are stored in the keypoint candidate list 532.

The inter octave keypoint selector 526 determines keypoints from the keypoint candidates stored in the keypoint candidate list 532 and performs sub-pixel refinement for the determined keypoints. The inter octave keypoint selector 526 uses RM pixel values of RM images stored in the RM buffer 524 to perform the keypoint determination and sub-pixel refinement. For each keypoint candidate, the inter octave keypoint selector 526 performs NMS using the 3×3 pixel plane in the adjacent octave. The keypoint candidate is validated as a keypoint if the RM pixel value of the keypoint candidate is larger or smaller than the neighboring 9 RM pixels of the 3×3 pixel plane in the adjacent octave. The sub-pixel refinement is performed to update the keypoint parameters of the determined keypoint. The inter octave keypoint selector 526 uses 2×3×3 pixel values from the current octave RM images. For each of the two scales in the octave, the immediate lower and higher scale is used to perform the sub-pixel refinement operation to generate the updated keypoint parameters. The updated keypoint parameters include possible updates to the x and y locations, a keypoint scale value (e.g., which may be different from the keypoint scale s), and a Laplacian score. Additional details regarding stage 3 processing by the inter octave keypoint selector 526 are discussed in connection with FIG. 8.

The keypoint list 528 is a memory circuit that stores the keypoints determined by the inter octave keypoint selector 526. Each keypoint is defined by the keypoint parameters, which may be updated by the inter octave keypoint selector 526 using the sub-pixel refinement.

The keypoint descriptor generator 530 is a circuit that generates a keypoint descriptor (e.g., a Fast Retina Keypoint (FREAK) descriptor) for each keypoint. The keypoint descriptor generator 530 determines descriptor comparison data for each keypoint and combines the descriptor comparison data with other keypoint parameters to generate the full keypoint descriptor. The keypoint descriptor generator 530 receives image data of the pyramid images from the pyramid image buffer 518 and keypoints from the keypoint list 528 and determines sample points for each keypoint. For each keypoint, the keypoint descriptor generator 530 determines an orientation angle θ by calculating difference in intensity values of the sample points, divided by the vector direction, of (e.g., 30) pixels around the keypoint. For each keypoint, the keypoint descriptor generator 530 rotates a set of (e.g., 43) pixels around the keypoint by the orientation angle θ of the keypoint to generate the descriptor comparison data defining the comparison results of a set of (e.g., 471) comparisons between pairs of sample points. The keypoint descriptors are sent (e.g., via a direct memory access (DMA)) to the system memory 230 for sharing with the CPU 208. Additional details regarding stage 4 processing by the keypoint descriptor generator 530 are discussed in connection with FIG. 9.

Figure 6:
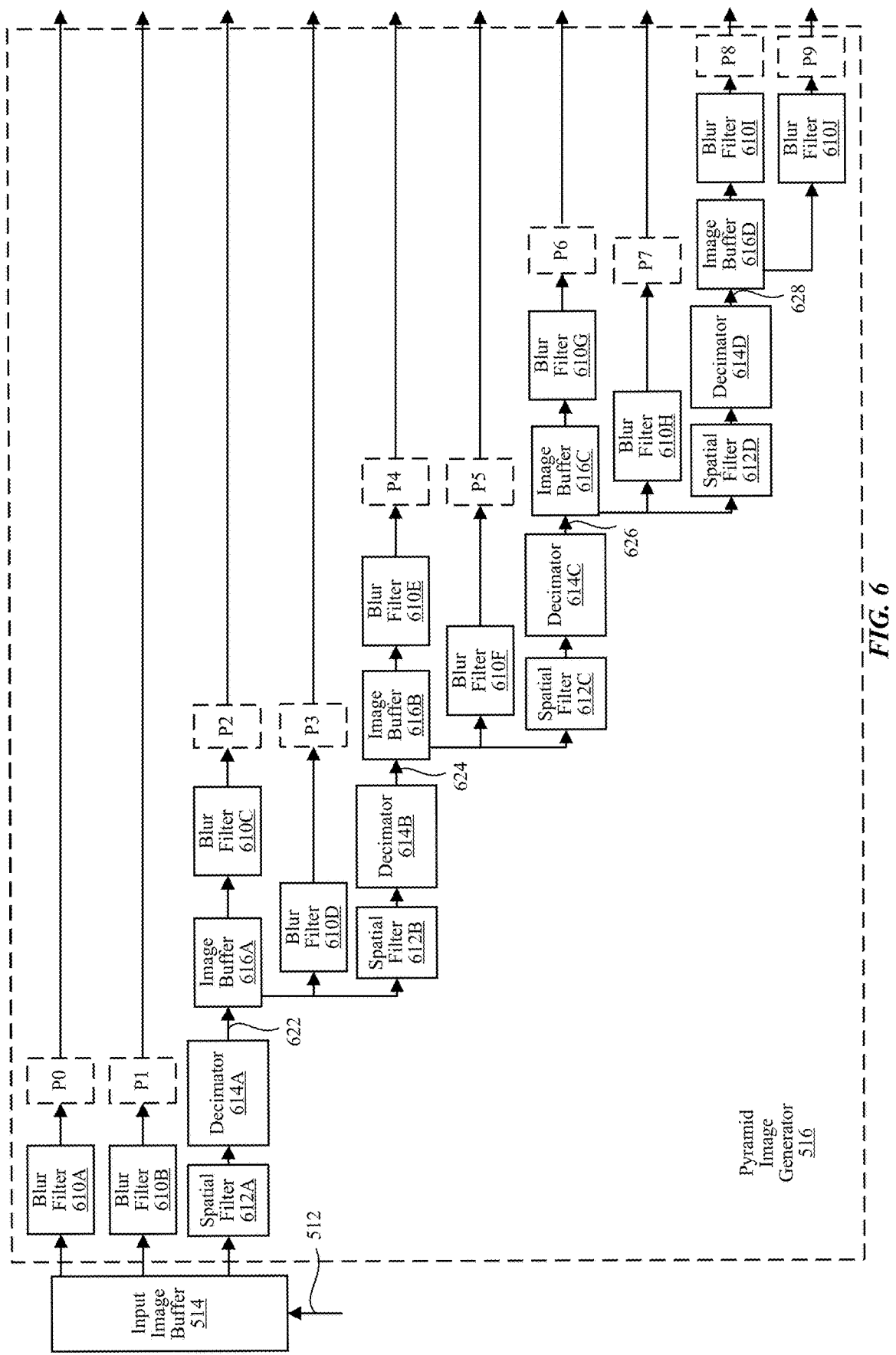
FIG. 6 is a block diagram of a pyramid image generator, according to one embodiment.

FIG. 6 is a block diagram of a pyramid image generator 516, according to one embodiment. The pyramid image generator 516 generates pyramid images P0 through P9 using image data of the image 512 stored in the input image buffer 514. The image pyramid may be a gaussian pyramid where the smoothing is performed using a gaussian function as defined by:

$$G(x, y) = \frac{1}{\sqrt{2\pi\sigma^2}} e^{-\frac{x^2+y^2}{2\sigma^2}} \quad \text{Equation 1}$$

where x is the pixel distance from the origin in the horizontal axis, y is the pixel distance from the origin in the vertical axis, and σ is the standard deviation of the Gaussian distribution.

Pyramid images P0 and P1 are two scales in the lowest octave, P2 and P3 are two scales in the next octave, P4 and P5 are two scales in the next octave, P6 and P7 are two scales in the next octave, and P8 and P9 are two scales in the highest octave. For each octave, the pyramid images in the next higher octave have half the resolution in width and height. To generate the pyramid images, the pyramid image generator 516 includes blur filters 610A through 610J (individually referred to as blur filter 610), spatial filters 612A through 612D (individually referred to as spatial filter 612), decimators 614A through 614D (individually decimator 614), and image buffers 616A through 616D (individually referred to as image buffer 616). The blur filters 610 are each a filter that applies the gaussian function to smooth the image data. Different filters may use different σ values to apply different amounts of smoothing.

For image data at the first (lowest) octave, the blur filter 610A applies a gaussian filter with σ=1 to generate the pyramid image P0 using the image data of the image 512 from the input image buffer 514. The blur filter 610B applies a gaussian filter with σ=√2 to generate the pyramid image P1 using the image data of the image 512 stored in the input image buffer 514. To generate image data for the second octave, the spatial filter 612A and decimator 614A are applied to the image data of the image 512 from the input image buffer 514 to generate a buffer image 622 that is stored in the image buffer 616A. The buffer image 622 has half the resolution of the image 512.

For the image data at the second octave, the blur filter 610C applies a gaussian filter with σ=√7/8 to generate the pyramid image P2 from the image data in the image buffer 616A. The blur filter 610D applies a gaussian filter with σ=√15/8 to generate the pyramid image P3 from the image data stored in the image buffer 616A. To generate image data for the third octave, the spatial filter 612B and decimator 614B are applied to the image data of the buffer image 622 to generate a buffer image 624. The buffer image 624 has half the resolution of the buffer image 622. The buffer image 624 is stored in the image buffer 616B.

The blur filters 610 for each octave can begin to operate as soon as enough lines of the buffer image are in the image buffer 616 of the octave. For example, a 9×9 pixel size blur filter 910C may operate when there are at least 9 lines of the buffer image 622 in the image buffer 616A. Similarly, the spatial filter 612 and decimator 614 for each octave can begin as soon as enough lines of the buffer image are in the image buffer 616 of the octave. For example, if the spatial filter 612B uses a 2×2 pixel size filter, then generating image data for the next octave can begin when there are 2 lines of the buffer image 622 in the image buffer 616A. If the spatial filter 612B uses a 3×3 pixel size filter, then generating image data for the next octave can begin when there are 3 lines in the image buffer 616A. In view of the spatial filter 612B having a smaller filter size than the blur filters 610C and 610D, the spatial filter 612B can begin operation before the blur filters 610C and 610D. Furthermore, the time delay for generating image data of the next octave is reduced because the spatial filter 612B and decimator 614B operate in parallel with the blur filters 610C and 610D. The operation at each of the subsequent octaves work similarly.

For the image data at the third octave, the blur filter 610E applies a gaussian filter with σ=√7/8 to generate the pyramid image P4 from the image data in the image buffer 616B. The blur filter 610F applies a gaussian filter with σ=√15/8 to generate the pyramid image P5 from the image data stored in the image buffer 616B. To generate image data for the fourth octave, the spatial filter 612C and decimator 614C are applied to the image data of the buffer image 624 stored in the image buffer 616B to generate a buffer image 626 that is stored in the image buffer 616C. The buffer image 626 has half the resolution of the buffer image 624.

For the image data at the fourth octave, the blur filter 610G applies a gaussian filter with σ=√7/8 to generate the pyramid image P6 from the image data in the image buffer 616C. The blur filter 610H applies a gaussian filter with σ=√15/8 to generate the pyramid image P7 from the image data stored in the image buffer 616C. To generate image data for the fifth octave, the spatial filter 612D and decimator 614D are applied to the image data of the buffer image 626 stored in the image buffer 616C to generate a buffer image 628 that is stored in the image buffer 616D. The buffer image 628 has half the resolution of the buffer image 626.

For the image data at the fifth octave, the blur filter 610I applies a gaussian filter with σ=√7/8 to generate the pyramid image P8 from the image data in the image buffer 616D. The blur filter 610J applies a gaussian filter with σ=√15/8 to generate the pyramid image P9 from the image data stored in the image buffer 616D.

Figure 7:
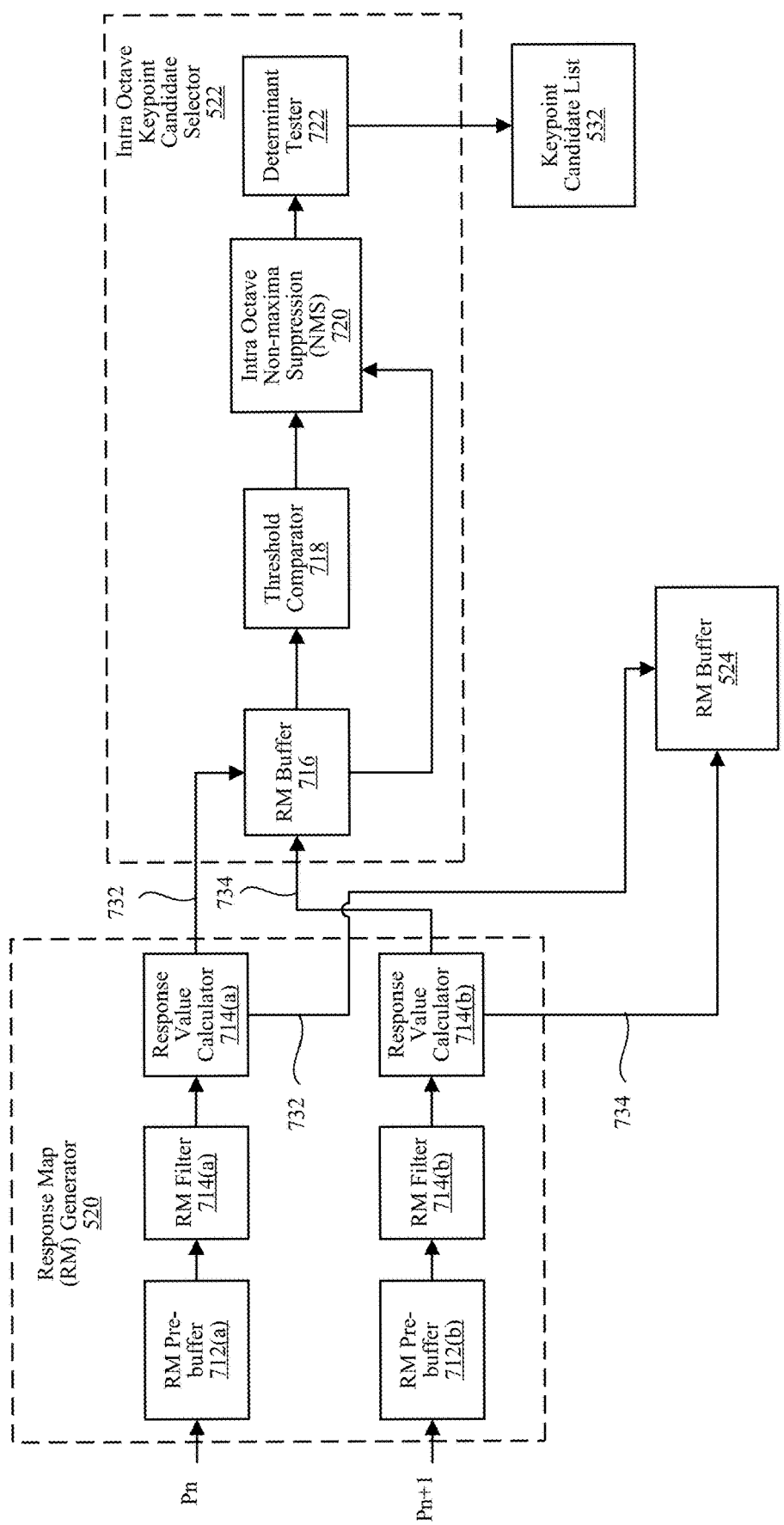
FIG. 7 is a block diagram of a response map (RM) generator and intra octave keypoint candidate selector for a single octave, according to one embodiment.

FIG. 7 is a block diagram of RM generator 520 and intra octave keypoint candidate selector 522 for a single octave, according to one embodiment. The RM generator 520 includes an RM pre-buffer 712A, an RM filter 714A, and a response value calculator 716A that processes image data of a pyramid image Pn of the nth scale to generate an RM image for the nth scale. The RM generator 520 also includes an RM pre-buffer 712B, an RM filter 714B, and a response value calculator 716B that processes image data of a pyramid image Pn+1 of the adjacent n+1th scale in the same octave to generate an RM image for the n+1th scale.

The RM pre-buffer 712A receives the image data of the pyramid image Pn from the pyramid image generator 516 and stores the image data for RM image generation. The RM filter 714A applies Laplacian filters (e.g., a 1×3 Laplacian filter (Lxx) followed by a 3×1 Laplacian filter (Lyy)) to the image data stored in the RM pre-buffer 712A. The response value calculator 714A determines response values 732 of the RM image using the Laplacian filtered results according to:

$$RM=\text{Norm}*(Lxx+Lyy) \quad \text{Equation 2}$$

where Norm is a normalization factor to normalize the RM results across the different scales and octaves. The RM pre-buffer 712A may store lines of the pyramid image Pn as they are generated by the pyramid image generator 516, and the RM filter 714A may begin operation when enough lines (e.g., 3 lines for the 3×3 Laplacian filter) are stored in the RM pre-buffer 712A. The RM pre-buffer 712B, RM filter 714B, and response value calculator 716B operate the same way for the adjacent scale of the same octave to determine response values 734. The response values 732 and 734 are provided to the RM buffer 524 and the intra octave keypoint candidate selector 522.

The intra octave keypoint candidate selector 522 may include, among other components, an RM buffer 716, a threshold comparator 718, an intra octave NMS 718, and a determinant tester 720. While the RM generator 520 generates a pixel line of an RM image, the intra octave keypoint candidate selector 522 finds keypoint candidates in the previously generated pixel line of the RM image.

The RM buffer 716 is a memory circuit that stores the response values 732 and 734 of the RM image for keypoint candidate determination. A keypoint candidate is found by passing the following criteria: (1) the absolute value of an RM pixel is greater than a threshold value, (2) the RM pixel value is a local minimum or a local maximum (NMS) in a surrounding 2×3×3 pixel box, and optionally (3) the RM pixel passes a determinant criterion.

The threshold comparator 718 is a circuit that compares the absolute values of the RM pixels to the threshold value. RM pixels that satisfy the threshold value are determined as potential keypoint candidates and are provided to the intra octave NMS 718. Different portions of an RM image may use different threshold values.

The intra octave NMS 720 is a circuit that receives response values 732 and 734 for the RM image of the octave from the RM buffer 716. The response values 732 and 734 are used to obtain the 2×3×3 pixel box surround each RM pixel that satisfied the threshold value. The intra octave NMS 720 compares each RM pixel that satisfies the threshold value to its neighboring 8 RM pixels of the same scale, and to the neighboring 9 (3×3) RM pixels in the adjacent scale of the same octave. If the RM pixel is either larger than all its 17 neighbors or smaller than all its 17 neighbor RM pixels, the RM pixel passes the NMS criterion and remains a keypoint candidate.

The determinant tester 722 applies a determinant criterion that verifies that a keypoint candidate is a corner by using the neighboring 8 RM pixels of the same scale. The determinant tester 722 throws out keypoint candidates that are less likely to be a corner and more likely to be a blob, which is a worse feature. The determinant test is applied using the following method, computed on the RM image: 3×1, 1×3 and 3×3 second derivative filters are applied to provide RMxx, RMyy and RMxy. The determinant of the RM is determined by calculating a determinant value DetRM and a trace square RM value TR2 according to:

$$\text{Det}RM = RMxx*RMyy - RMxy^2 \quad \text{Equation 3}$$

$$TR2 = (RMxx+RMyy)^2. \quad \text{Equation 4}$$

The determinant test passes when TR2/abs(DetRM)<DeterminanTestThreshold. The determinant tester 722 provides keypoint candidates that satisfy the determinant criterion to the keypoint candidate list 532.

The components of the RM generator 520 and intra octave keypoint candidate selector 522 shown in FIG. 7 process a single octave. The RM generator 520 and intra octave keypoint candidate selector 522 may each include additional instances of the shown components to process each of the octaves of the image pyramid. As such, RM images and keypoint candidates are generated for each of the scales of image pyramid.

Figure 8:
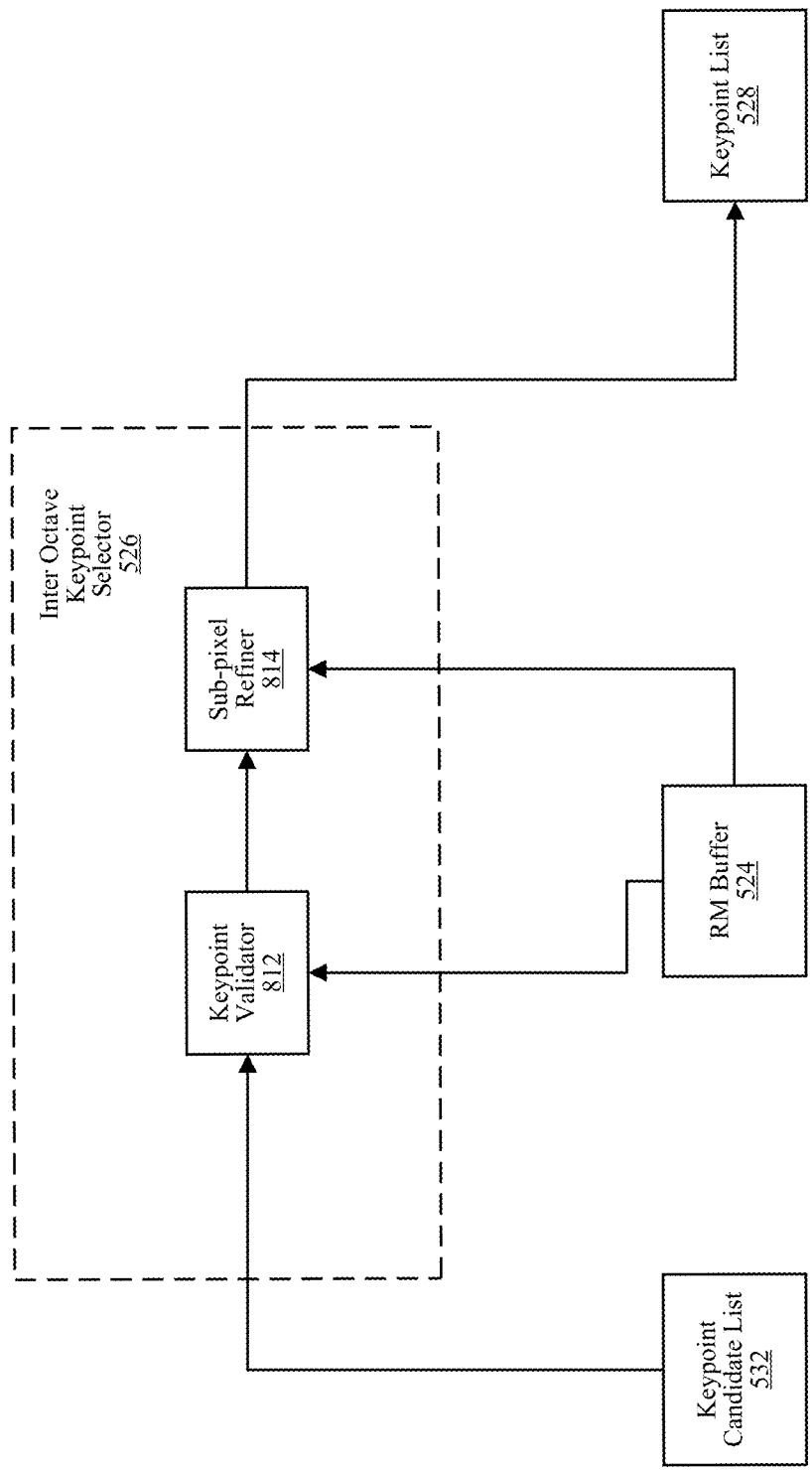
FIG. 8 is a block diagram of an inter octave keypoint selector, according to one embodiment.

FIG. 8 is a block diagram of the inter octave keypoint selector 526, according to one embodiment. The inter octave keypoint selector 526 includes a keypoint validator 812 and a sub-pixel refiner 814. The keypoint validator 812 receives keypoint candidates from the keypoint candidate list 532 and RM images from the RM buffer 524. For each keypoint candidate of a scale, the keypoint validator 812 performs inter octave NMS using a 3×3 pixel plane in the adjacent octave. The keypoint candidate is in a scale called a keypoint scale s (also referred to as "physical scale"). The keypoint scale s is between the 3×3 pixel plane of the same octave used for intra octave NMS and the adjacent 3×3 pixel plane of the adjacent octave used for the inter octave NMS. The 3×3 pixel plane in the adjacent octave is in the lower octave if the keypoint scale s is even (e.g., P0, P2, P4, P6, or P8) or the higher octave if the keypoint scale s is odd (e.g., P1, P3, P5, P7, or P9). If the 3×3 pixel plane is in the higher octave, the 3×3 pixel plane is interpolated to get an equivalent 3×3 pixel plane. If the 3×3 pixel plane is in the lower octave, the 3×3 pixel plane is down sampled to get an equivalent 3×3 pixel plane. The keypoint candidate is validated as a keypoint if the RM pixel value of the keypoint candidate is larger or smaller than the neighboring 9 RM pixels of the 3×3 pixel plane in the adjacent octave. Otherwise, the keypoint candidate is discarded. The keypoint validator 812 provides the validated keypoints to the sub-pixel refiner 814.

The sub-pixel refiner 814 updates the keypoint parameters of the validated keypoints. The updated keypoint parameters include updated x and y locations, a keypoint scale value (also referred to as "KP. Scale") that may be different from the keypoint scale s, and a Laplacian score value. For each keypoint, the sub-pixel refiner 814 reads 2×3×3 RM pixel values from the scales of the octave containing the keypoint. For each of the two scales in the octave, the sub-pixel refiner 814 uses the scale and the immediate lower and higher scales (three scales) to perform the sub-pixel refinement operation. Thus, one scale from outside of the octave is always being used. If the keypoint scale s is even, then the s−1 scale is down sampled. If the keypoint scale s is odd, then the s+1 scale is up sampled. The sub-pixel refiner 814 calculates first order derivatives Ds, Dx, and Dy and second order derivatives Dss, Dxx, Dyy, and Dxy from the 3×3×3 RM values of the three scales, and uses these values to calculate sub-pixel values for 3 dimensions (scale, x, y) according to:

$$H*d=b \quad \text{Equation 5}$$

where H=[Dxx Dxy; Dxy Dyy], b=[−Dx; −Dy], d is the RM image, and x and y are the integer coordinates of the keypoint.

The keypoint scale value may be calculated separately and in parallel with the x and y values to reduce the complexity of the calculations. The keypoint scale value may be calculated according to:

$$\text{Keypoint scale value} = -Ds/Dss \qquad \text{Equation 6}$$

The keypoint scale value includes a sub-scale value that may be positive or negative, which defines an adjustment to the keypoint scale s. If the sub-scale value is positive, then the keypoint scale value is greater than the keypoint scale s. If the sub-scale value is positive, then the keypoint scale value is less than the keypoint scale s.

The sub-pixel refiner 814 determines the Laplacian score using bilinear interpolation of the updated x and y values. The Laplacian score is the RM pixel value of the keypoint at the refined x and y values and the keypoint scale value. After determining the updated keypoint parameters including the x and y values, the keypoint scale value, and the Laplacian score for a keypoint, the sub-pixel refiner 814 provides the keypoint and the updated keypoint parameters to the keypoint list 528. Lines of the RM image data that are no longer needed for keypoint selection may be removed from the RM buffer 524 to make room for additional lines, which are then similarly processed for keypoint selection by the inter octave keypoint selector 526.

Figure 9:
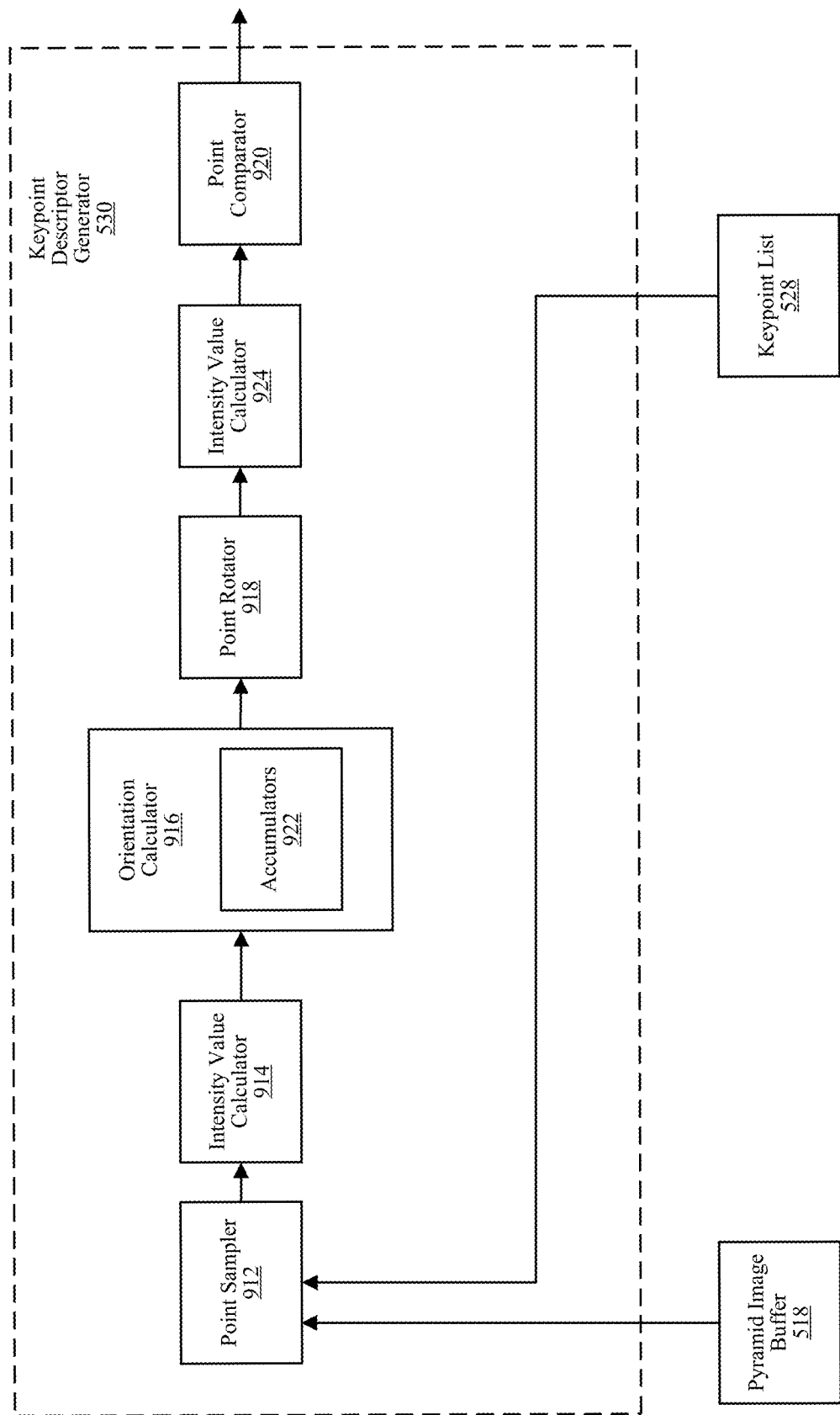
FIG. 9 is a block diagram of a keypoint descriptor generator, according to one embodiment.

FIG. 9 is a block diagram of the keypoint descriptor generator 530, according to one embodiment. The keypoint generator 530 determines an orientation angle θ of each keypoint and generates descriptor comparison data of the keypoint using the orientation angle θ of the keypoint. The descriptor comparison data of each keypoint is combined with the keypoint parameters of the keypoint to generate the complete keypoint descriptor (e.g., FREAK descriptor). The keypoint descriptor generator 530 includes a point sampler 912, an intensity value calculator 914, an orientation calculator 916, a point rotator 918, a point comparator 920, and an intensity value calculator 924.

The point sampler 912 receives the keypoints from the keypoint list 528 and the image data of the pyramid images from the pyramid image buffer 518 and samples a patch of image data for each sample point of each keypoint. For orientation angle θ calculation of each keypoint, the point sampler 912 samples 5 scales, and 6 points for each scale, for a total of 30 points. For descriptor comparison data generation for each keypoint, the point sampler 912 samples 7 scales, 6 points for each scale, which together with the center point results in a total of 43 points.

For each scale, the sample points that are sampled by the point sampler 912 are created from a circle having a radius determined based on the scale in which the keypoint is located and the sub-scale value of the keypoint. In case the sub-scale value is greater or equal to 0, the sample points are sampled from the keypoint scale s where the keypoint was found in to keypoint scale s+4 (for orientation), or to keypoint scale s+6 (for comparison). When the sub-scale value is negative, the sample points are sampled from the keypoint scale s to keypoint scale s+3 (for orientation), or to keypoint scale s+6 (for comparison). The sub-scale value refers to an adjustment value that is applied to the keypoint scale s using sub-pixel refinement to generate a keypoint scale value. The keypoint scale value may be different from the integer 1-8 keypoint scale s defining the scale that the keypoint was found at. The keypoint scale value may be an interpolated non-integer value which can be any number between 0-9. For example, a keypoint can be found at a certain location for example (x, y)=(100, 200) and at scale 2, after sub-pixel interpolation the keypoint location can change to (x, y)=(100.3, 199.7) and scale of 2.25.

The point sampler 912 samples the 6 points per scale at a radius r from the keypoint that is determined by:

$$r = 2 * \frac{\sqrt{2}^{Scale}}{2^{Octave}} \qquad \text{Equation 7}$$

where Scale starts as the keypoint scale value and is added with 1 for every subsequent scale, and Octave is the octave of the scale.

In case the keypoint scale value is greater or equal to the keypoint scale s, 6 points are sampled from every scale starting with the keypoint scale s. In case the keypoint scale value is less than the scale s in which the keypoint was found in (e.g., keypoint found in scale 3 with keypoint scale value=2.2), two sets of 6 points are sampled from the first scale s, and the rest are sampled from subsequent scales. The formula used to sample all 7 sets of samples for orientation calculation and comparison generation is shown in Table 1:

TABLE 1

| Sample Retina Set | Radius Calculation | Sample From Scale When KP.Scale < physical scale | Sample From Scale When KP.Scale >= physical scale |
|---|---|---|---|
| 0 | $2 * \frac{\sqrt{2}^{(Scale)}}{2^{Octave}}$ | s | s |
| 1 | $2 * \frac{\sqrt{2}^{(Scale+1)}}{2^{Octave}}$ | s | s + 1 |
| 2 | $2 * \frac{\sqrt{2}^{(Scale+2)}}{2^{Octave}}$ | s + 1 | s + 2 |
| 3 | $2 * \frac{\sqrt{2}^{(Scale+3)}}{2^{Octave}}$ | s + 2 | s + 3 |
| 4 | $2 * \frac{\sqrt{2}^{(Scale+4)}}{2^{Octave}}$ | s + 3 | s + 4 |
| 5 | $2 * \frac{\sqrt{2}^{(Scale+5)}}{2^{Octave}}$ | s + 4 | s + 5 |
| 6 | $2 * \frac{\sqrt{2}^{(Scale+6)}}{2^{Octave}}$ | s + 5 | s + 6 |

Figure 10:
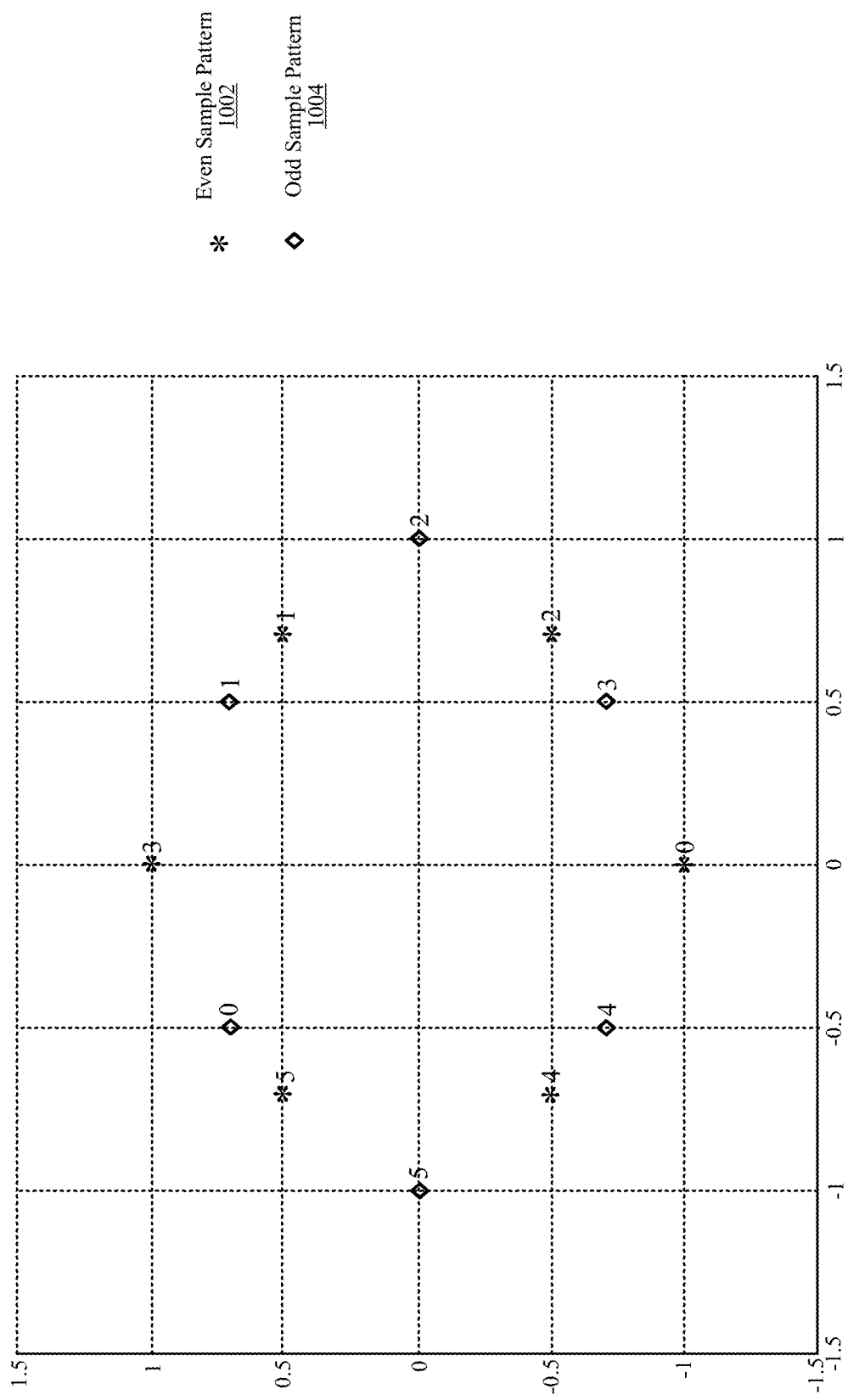
FIG. 10 shows an even sample pattern and an odd sample pattern, according to one embodiment.

The point sampler 912 alternates between even and odd sampling patterns for the scales to sample the points around the keypoint at radius r. FIG. 10 shows an even sample pattern 1002 and an odd sample pattern 1004, according to one embodiment. For each keypoint, the sampling starts with the even sample pattern at the keypoint scale s and alternates between the even and odd sample patterns for successive scales. Each of the even sample pattern 1002 and odd sample pattern 1004 is a ring with six sample points. The sample points for each pattern are labeled from 0 to 5, and this order is used for orientation calculation and point comparisons. The x, y locations of each sample point sample_x, sample_y is defined by:

$$\text{sample\_}x = cx + \cos(\theta) * radius * dx - \sin(\theta) * radius * dy \qquad \text{Equation 8}$$

$$\text{sample\_}y = cy + \sin(\theta) * radius * dx + \cos(\theta) * radius * dy \qquad \text{Equation 9}$$

where (cx, cy) are the coordinates of the keypoint value at the current scales resolution, θ is the orientation angle, radius is defined by Equation 7, and (dx, dy) are the coordinates of the sampling pattern (for radius=1) as for the even ring defined by:

$$[dx,dy]=\{[-0.5,(\sqrt{2})/2],[0.5,(\sqrt{2})/2],[1,0],[0.5,-(\sqrt{2})/2],\\ [-0.5,-(\sqrt{2})/2],[-1,0]\}$$  Equation 10 and as defined for the odd ring by:

$$[dx,dy]=\{[0,-1],[(\sqrt{2})/2,0.5],[(\sqrt{2})/2,-0.5],[0,1],[-(\sqrt{2})/2,-0.5],[-(\sqrt{2})/2,0.5]\}$$  Equation 11

For point sampling by the orientation point sampler 912, the orientation angle θ in Equations 8 and 9 is set to zero. After the orientation angle θ is calculated for a keypoint, the calculated orientation angle θ is used in Equations 8 and 9. The center point of the keypoint is also sampled for the comparison sampling. The point sampler 912 reads a patch of image data for each sample point. Each patch may include pixel values used for the orientation angle calculation and pixel values used for sample point comparisons to avoid re-fetching from the pyramid image buffer 518. The patch size in pixels may vary based on the scale.

The intensity value calculator 914 determines an intensity value for each the sample points using a bilinear interpolation of the neighbor pixels at integer grids. For each sample point, the bilinear interpolation is performed using the patch from the point sampler 912. The patch is used to sample 2×2 pixels around each sample point that is needed for orientation calculation, then the orientation is applied to rotate the sample points thus changing the 2×2 pixels around each sample point. As such, the patch may be a 10×10 patch of pixels to ensure that all the pixels needed for fetching the 2×2 pixels before and after rotation around each of the sample points are in the patch. The patch size ensures that all needed pixel values are within the patch so that no re-fetch from the pyramid image buffer 518 is needed between the orientation calculation and the descriptor generation. The interpolation is performed in the horizontal direction and the vertical direction using the pixel values of the patch to determine the intensity value of the sample point.

The orientation calculator 916 determines the orientation angle θ of each keypoint. After the intensity value of each sample point is calculated, the orientation calculator 916 adds the intensity value into one of a set of accumulators 922. The orientation calculator 914 may include a total of 6 accumulators 922. Depending on the sample pattern (even vs odd) and label ([0:5]) of the sample points, the intensity values go to different accumulators 922. After accumulating all the intensity values, the orientation calculator 916 determines the overall orientation values (ori_x, ori_y). The orientation calculator 916 determines the orientation angle θ using:

$$\theta = A\ \text{TAN}(ori\_y, ori\_x)$$  Equation 12 where the values of cos(θ) and sin(θ) are obtained using:

$$mag = ori\_x^2 + ori\_y^2$$  Equation 13

$$\sin(\theta) = ori_x * \frac{1}{\sqrt{mag}}$$  Equation 14

$$\sin(\theta) = ori_x * \frac{1}{\sqrt{mag}}$$  Equation 15

The orientation calculator 916 provides the orientation angle θ of each keypoint to the to the point rotator 918 for rotating the sample points by the orientation angle θ.

For each keypoint, the point rotator 918 rotates each of the 43 points from the point sampler 912 by the orientation angle θ. The 43 sample points include the center point at scale s and the remaining 42 points that are sampled from the 7 scales (e.g., s to s+6), with 6 points per scale, by the point sampler 912. The rotation changes the comparison point sampling by rotating the sample points clockwise in the amount of the orientation angle.

The intensity value calculator 924 determines an intensity value for each the sample points used for comparisons using a bilinear interpolation of the neighbor (e.g., 2×2) pixels at integer grids. The intensity value calculator 924 operates like the intensity value calculator 914 except using pixel values for rotated sample points.

The point comparator 920 performs, for each keypoint, comparisons of the intensity values of pairs of sample points from the intensity value calculator 924 to generate descriptor comparison data for each keypoint. For example, the point comparator 920 may perform 472 comparisons for each keypoint. For a first set of 42 comparisons, the point comparator 920 compares the intensity value of the center sample point to the intensity values of the other 42 sample points. For a second set of 105 comparisons, the point comparator 920 compares the intensity values of every pair of sample points in the same scale. There are 15 comparisons per ring and a total of 7 rings. For a third set of 216 compares, the point comparator 920 compares intensity values of every pair of sample points in adjacent scales. There are 36 comparisons per scale pair and 6 total adjacent scale pairs. For a fourth set of 108 comparisons, the point comparator 920 compares the intensity values of sample points for every even-ring pair and odd-ring pair. For each ring pair, the sample points are compared with those of the same phase in the other scale, and the sample points with those of the opposite phase in the other scale. Therefore, there are 12 comparison per scale pair and total 9 scale pairs. The number of sample points, the number of comparisons, the order of the comparisons, or the sample point pairs selected for the comparisons may vary.

The descriptor comparison data for each keypoint may include a sequence of bit values, where each of the bit values corresponds with a comparison result between two sample points. For the 472 comparisons, the descriptor comparison data may include 472 bit values with each bit corresponding to one of the 472 comparisons. For each bit, a value of 1 is assigned when a first sample point has a larger intensity value than a second sample point, and a value of 0 is assigned when the first sample point has a smaller intensity value than the second sample point.

The point comparator 920 combines the descriptor comparison data including the sequence of bit values of each keypoint with the keypoint parameters of the keypoint to generate the full keypoint descriptor. The point comparator 920 receives the keypoint parameters and keypoints from the keypoint list 528 for combination with the descriptor comparison data. The point comparator 920 then outputs the keypoint descriptor.

Example Processes for Keypoint Descriptor Generation and Keypoint Determination

Figure 11:
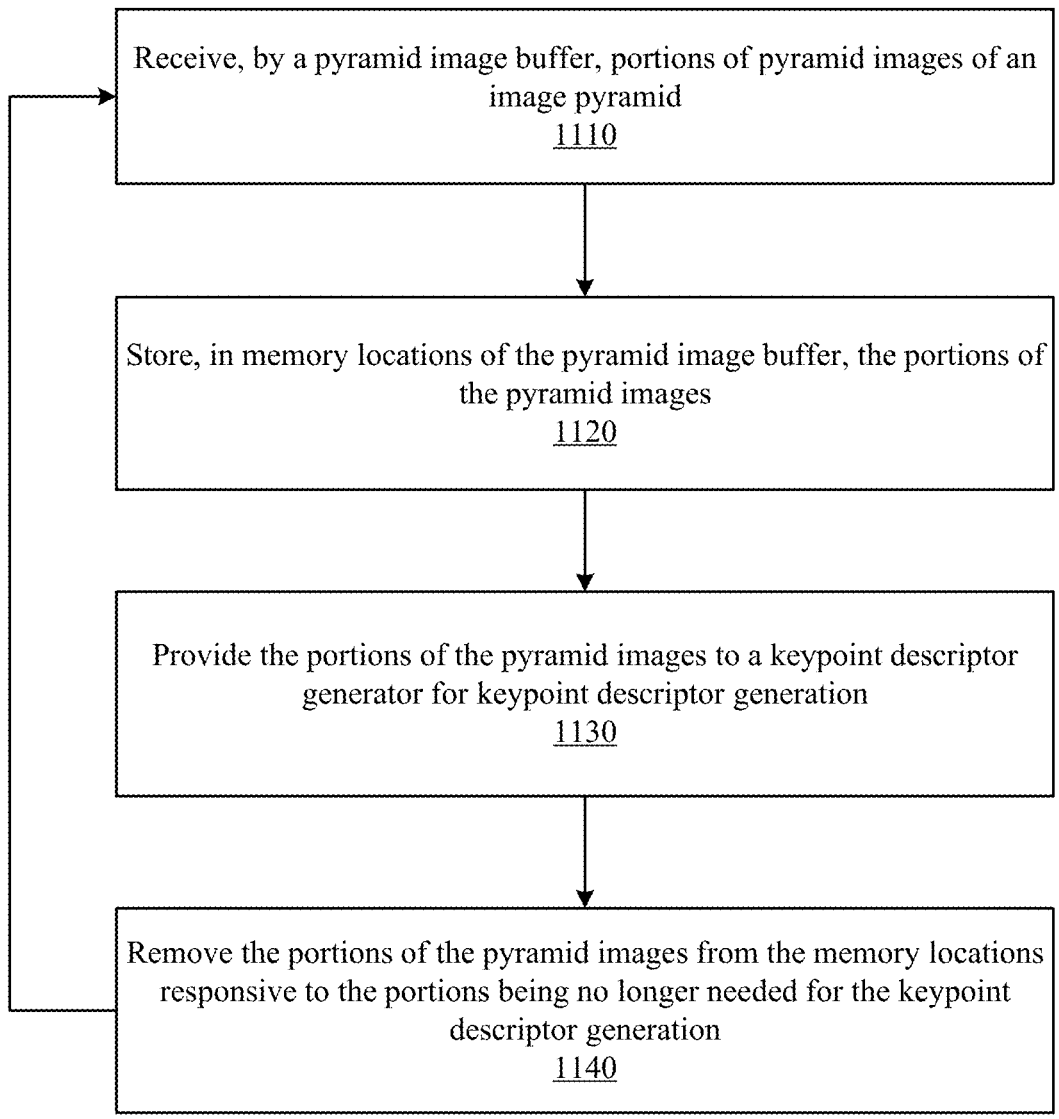
FIG. 11 is a flowchart illustrating a method for keypoint descriptor generation, according to one embodiment.

FIG. 11 is a flowchart illustrating a method for keypoint descriptor generation, according to one embodiment. The method may include additional or fewer steps, and steps may be performed in different orders. The feature extractor circuit 500 uses a sliding window mechanism for the keypoint descriptor generation where the pyramid image buffer 518 stores different portions of the pyramid images generated by the pyramid image generator 516 at different times.

After the portions (e.g., lines) of the pyramid images of the image pyramid that are stored in the pyramid image buffer 518 have been processed for keypoint descriptor generation and are no longer needed for the keypoint descriptor generation, they are removed from the pyramid image buffer 518 to provide space for storing other (e.g., subsequently generated) portions of the pyramid images of the pyramid image that have not been processed for the keypoint descriptor generation and are needed for the keypoint descriptor generation. By storing only portions of the pyramid images at any one time and removing processed portions, the required memory size of the pyramid image buffer 518 can be reduced.

The pyramid image buffer 518 receives 1110 portions of pyramid images of an image pyramid. The portions of the pyramid images are generated by the pyramid image generator 516, which provides the portions of the pyramid images to the pyramid image buffer 518. The portions of the pyramid images have not been processed for generation of keypoint descriptors of keypoints. Rather than waiting until after full pyramid images have been created to transmit to the pyramid image buffer 518, the pyramid image generator 516 may provide the portions of the pyramid images as they are generated.

The pyramid image buffer 518 stores 1120, in memory locations of the pyramid image buffer 518, the portions of the pyramid images. The portions of the pyramid images are stored in the pyramid image buffer 518 to facilitate keypoint descriptor generation. The pyramid image buffer 518 stores different portions of the pyramid images generated by the pyramid image generator 516 at different times.

The pyramid image buffer 518 provides 1130 the portions of the pyramid images to the keypoint descriptor generator 530 for keypoint descriptor generation. While the pyramid image buffer 518 stores the portions of the pyramid mages, the inter octave keypoint selector 526 determines the keypoints in the portions of the pyramid images using portions of RM images stored in an RM buffer 524 and provides the keypoints to the keypoint list 528. As discussed in greater detail in connection with FIG. 12, the keypoint determination also uses a sliding window mechanism where only portions of the RM images are stored in the RM buffer 524 at any one time.

To generate the descriptor comparison data of the keypoint descriptors, the keypoint descriptor generator 530 receives the keypoints and their keypoint parameters from the keypoint list 528. The keypoint parameters include the scale value s, the x image location, and the y image location. For each keypoint, the keypoint descriptor generator 530 uses (e.g., even and odd) sample patterns for the sampling points across multiple scales and reads pixel patches for each of the sample points. In view of the pixel value needs of each keypoint, the keypoint descriptor generator 530 retrieves the portions (e.g., lines) of the pyramid images that contain the needed pixels values from the pyramid image buffer 518 to generate the descriptor comparison data for the keypoint.

The pyramid image buffer 518 removes 1140 the portions of the pyramid images from the memory locations responsive to the portions being no longer needed for the keypoint descriptor generation by keypoint descriptor generator 530. For example, when portions (e.g., one or more lines) of a pyramid image are no longer needed for keypoint descriptor generation for any of the remaining keypoints in the keypoint list 528, then the portion of the pyramid image can be removed from the pyramid image buffer 518.

The method of FIG. 11 may be repeated until all keypoint descriptors have been generated for all the keypoints in the keypoint list 528. For example, after removing the portions of the pyramid images from the memory locations, the pyramid image buffer 518 may receive 1110 other portions of the pyramid images. The other portions are generated by the pyramid image generator 516 (e.g., while the previous portions where being processed for keypoint descriptor generation) and have not been processed for keypoint descriptor generation. The other portions of the pyramid images are stored 1120 in the pyramid image buffer 518 and provided 1130 to the keypoint descriptor generator 530 for the keypoint descriptor generation. After the process for the keypoint descriptor generation, these portions of the pyramid images are removed 1140 from the memory locations in the pyramid image buffer 518, and so forth until keypoint descriptors have been generated for all the keypoints.

Figure 12:
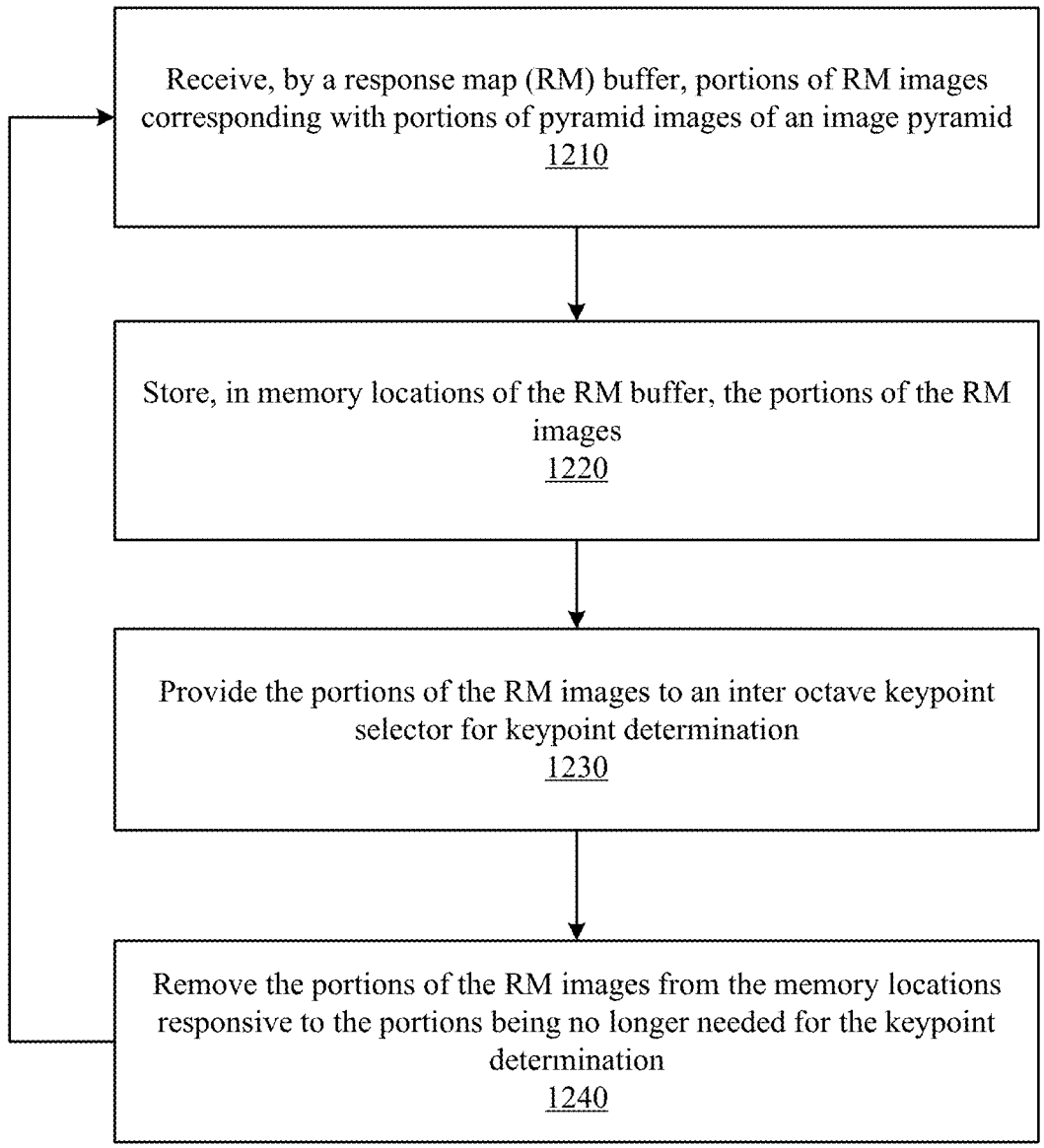
FIG. 12 is a flowchart illustrating a method for keypoint determination, according to one embodiment.

FIG. 12 is a flowchart illustrating a method for keypoint determination, according to one embodiment. The keypoint determination may be performed to identify keypoints for portions of the pyramid images. For each portion of the pyramid image, an RM generator 520 generates a portion of an RM image that is stored in the RM buffer 524 for keypoint determination. The keypoint determination may be performed while the portions of the pyramid images are stored 1120 in the pyramid image buffer 518. After the keypoint determination, the portions of the image images stored in the pyramid image buffer 518 that correspond with the with the determined keypoints are provided 1130 to the keypoint descriptor generator 530, as discussed above in connection with FIG. 11.

The feature extractor circuit 500 uses a sliding window mechanism for the keypoint determination where the RM buffer 524 stores different portions of the RM images at different times. After the portions (e.g., lines) of the RM images that are stored in the RM buffer 524 are processed for keypoint determination and are no longer needed for the keypoint determination, they are removed from the RM buffer 524 to provide space for storing other (e.g., subsequently generated) portions of the RM images that have not been processed for keypoint determination are needed for the keypoint determination. By storing only portions of the RM images at any one time and removing processed portions, the required memory size of the RM buffer 524 can be reduced.

The RM buffer 524 receives 1210 portions of RM images corresponding with portions of pyramid images of an image pyramid generated by RM generator 520. For example, as the pyramid image generator 516 provides the portions of the pyramid images as they are generated to the pyramid image buffer 518 and the RM generator 520. The RM generator 520 generates the corresponding portions of the RM images using the portions of the pyramid images and stores the portions of the RM images in the RM buffer 524. The RM generator 520 also provides the portions of the RM images to the intra octave keypoint candidate selector 522, which applies intra octave non-maxima suppression (NMS) to the portion of the RM images to generate keypoint candidates. The keypoint candidates are stored in the keypoint candidate list 532.

The RM buffer 524 stores 1220, in memory locations of the RM buffer 524, the portions of the pyramid images. The portions of the RM images are stored in the RM buffer 524 to facilitate keypoint determination.

The RM buffer 524 provides 1230 the portions of the RM images to an inter octave keypoint selector 526 for keypoint determination. For example, the inter octave keypoint selector 526 receives the keypoint candidates and the keypoint parameters of the keypoint candidates from the keypoint candidate list 532. The keypoint parameters include the scale value s, the x image location, and the y image location. For each keypoint candidate, the inter octave keypoint selector 526 uses a 3×3 pixel plane in the adjacent octave to the keypoint candidate for inter octave NMS and uses 2×3×3 pixel values around the keypoint candidate from the octave to perform sub-pixel refinement. In view of the pixel value needs of each keypoint candidate, the inter octave keypoint selector 526 retrieves the portions (e.g., lines) of the RM images that contain the needed pixels values from the RM buffer 524 to perform the keypoint determination and sub-pixel refinement. The inter octave keypoint selector 526 provides the determined keypoints to the keypoint list 528.

The RM buffer 524 removes 1240 the portions of the RM images from the memory locations responsive to the portions being no longer needed for the keypoint determination. For example, when portions (e.g., one or more lines) of an RM image are no longer needed for keypoint determination for any of the remaining keypoint candidates in the keypoint candidate list 532, then the portion of the RM image can be removed from the RM buffer 524.

The method of FIG. 12 may be repeated until all keypoint candidates from the keypoint candidate list 532 have been processed and determined as either valid or invalid keypoints. For example, after removing the portions of the RM images from the memory locations, the RM buffer 524 may receive 1210 other portions of the RM images. The other portions of the RM images are generated by the RM generator 520 (e.g., while the previous portions where being processed for keypoint determination) and have not been processed for the keypoint determination. The other portions of the RM images are stored 1220 in the RM buffer 524 and provided 1230 to the inter octave keypoint selector 526 for the keypoint determination. Responsive to no longer being needed for the keypoint determination, the other portions of the RM images are removed 1240 from the memory locations in the RM buffer, and so forth until each keypoint candidate has been processed.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus, comprising:
  a pyramid image generator circuit configured to generate an image pyramid from an input image, the image pyramid including pyramid images at different octaves and scales;
  a response map (RM) generator circuit configured to generate RM images based on the pyramid images, the RM images comprising a first subset of RM images of a first octave of the different octaves and a second subset of RM images of a second octave of the different octaves;
  an intra octave keypoint candidate selector circuit configured to determine keypoint candidates of keypoints of the input image based on a comparison between at least two RM images in the first subset of RM images of the first octave;
  an inter octave keypoint selector circuit configured to determine keypoints from the keypoint candidates based on a comparison between the first subset of RM images and the second subset of RM images;
  a keypoint descriptor generator circuit configured to process the pyramid images and the keypoints for keypoint descriptor generation of the keypoints;
  a pyramid image buffer circuit configured to store different portions of the pyramid images at different times, for sending to the keypoint descriptor generator circuit for the keypoint descriptor generation, and
  an RM buffer circuit configured to store different portions of the RM images generated at different times, for sending to the inter octave keypoint selector circuit for keypoint candidate determination.

2. The apparatus of claim 1, wherein, the pyramid image buffer circuit is further configured to stores portions of full pyramid images of the image pyramid.

3. The apparatus of claim 1, wherein the pyramid image buffer circuit has a storage size that is smaller than a data size of the image pyramid.

4. The apparatus of claim 1, wherein the pyramid image buffer circuit is further configured to:
  provide first portions of the pyramid images stored in memory locations of the pyramid image buffer circuit to the keypoint descriptor generator circuit for the keypoint descriptor generation;
  remove the first portions of the pyramid images from the memory locations responsive to the first portions being no longer needed for the keypoint descriptor generation by the keypoint descriptor generator circuit; and
  store second portions of the pyramid images that are needed for the keypoint descriptor generation by the keypoint descriptor generator circuit in the memory locations that previously stored the first portions of the pyramid images.

5. The apparatus of claim 4, wherein the pyramid image buffer circuit is further configured to:
  provide the second portions of the pyramid images stored in the memory locations to the keypoint descriptor generator circuit for the keypoint descriptor generation; and
  remove the second portions of the pyramid images from the memory locations responsive to the second portions being no longer needed for the keypoint descriptor generation by the keypoint descriptor generator circuit.

6. The apparatus of claim 1, wherein:
  the pyramid image generator circuit, the keypoint descriptor generator circuit, and the pyramid image buffer circuit are located on an integrated circuit (IC) chip; and
  the pyramid image buffer circuit is a static random-access memory (SRAM).

7. The apparatus of claim 1, wherein the RM buffer circuit is further configured to:
  provide first portions of the RM images stored in memory locations of the RM buffer circuit to the inter octave keypoint selector circuit for keypoint determination;
  remove the first portions of the RM images from the memory locations responsive to the first portions being no longer needed for the keypoint determination by the inter octave keypoint selector circuit; and
  store second portions of the RM images that are needed for the keypoint determination by the inter octave keypoint selector circuit in the memory locations that previously stored the first portions of the RM images.

8. The apparatus of claim 7, wherein the RM buffer circuit is further configured to:
provide the second portions of the RM images stored in the memory locations to the inter octave keypoint selector circuit for keypoint determination; and
remove the second portions of the RM images from the memory locations responsive to the second portions being no longer needed for the keypoint determination by the inter octave keypoint selector circuit.

9. The apparatus of claim 1, wherein, the RM buffer circuit is not configured to store full RM images.

10. The apparatus of claim 1, wherein the RM buffer circuit has a storage size that is smaller than a data size of all RM images.

11. The apparatus of claim 1, wherein:
the RM generator circuit, the inter octave keypoint selector circuit, and RM buffer circuit are located on an integrated circuit (IC) chip; and
the RM buffer circuit is a static random-access memory (SRAM).

12. The apparatus of claim 1, wherein the intra octave keypoint candidate selector circuit is configured to determine the keypoint candidates by applying intra octave non-maxima suppression (NMS) to the RM images, and wherein the inter octave keypoint selector circuit is configured to determines the keypoints from the keypoint candidates by applying inter octave NMS to the RM images.

13. The apparatus of claim 1, wherein the inter octave keypoint selector circuit is configured to determine the keypoints in multiple RM images simultaneously.

14. A method, comprising:
generating, by a pyramid image generator circuit, an image pyramid from an input image, the image pyramid including pyramid images at different octaves and scales;
generating, by a response map generator circuit, response map images based on the pyramid images, the response map images comprising a first subset of response map images of a first octave of the different octaves and a second subset of response map images of a second octave of the different octaves;
determining, by an intra octave keypoint candidate selector circuit, keypoint candidates of keypoints of the input image based on a comparison between at least two response map images in the first subset of response map images of the first octave;
determining, by an inter octave keypoint selector circuit, keypoints from the keypoint candidates based on a comparison between the first subset of response map images and the second subset of response map images;
processing, by a keypoint descriptor generator circuit, the pyramid images and the keypoints for keypoint descriptor generation of the keypoints;
storing, by a pyramid image buffer circuit, different portions of the pyramid images at different times, for sending to the keypoint descriptor generator circuit for the keypoint descriptor generation; and
storing, by a response map buffer circuit, different portions of the response map images generated at different times, for sending to the inter octave keypoint selector circuit for keypoint candidate determination.

15. The method of claim 14, further comprising:
providing, by the pyramid image buffer circuit, first portions of the pyramid images stored in memory locations of the pyramid image buffer circuit to the keypoint descriptor generator circuit for the keypoint descriptor generation;
removing, by the pyramid image buffer circuit, the first portions of the pyramid images from the memory locations responsive to the first portions being no longer needed for the keypoint descriptor generation by the keypoint descriptor generator circuit; and
storing, by the pyramid image buffer circuit, second portions of the pyramid images that are needed for the keypoint descriptor generation by the keypoint descriptor generator circuit in the memory locations that previously stored the first portions of the pyramid images.

16. The method of claim 14, further comprising storing, by the pyramid image buffer circuit, portions of full pyramid images of the image pyramid.

17. The method of claim 14, wherein the pyramid image buffer circuit has a storage size smaller than a data size of the image pyramid.

18. A system, comprising:
an image sensor configured to obtain an input image; and
an image signal processor connected to the image sensor, the image signal processor including:
a pyramid image generator circuit configured to generate an image pyramid from the input image, the image pyramid including pyramid images at different octaves and scales;
a response map (RM) generator circuit configured to generate RM images based on the pyramid images, the RM images comprising a first subset of RM images of a first octave of the different octaves and a second subset of RM images of a second octave of the different octaves;
an intra octave keypoint candidate selector circuit configured to determine keypoint candidates of keypoints of the input image based on a comparison between at least two RM images in the first subset of RM images of the first octave;
an inter octave keypoint selector circuit configured to determine keypoints from the keypoint candidates based on a comparison between the first subset of RM images and the second subset of RM images;
a keypoint descriptor generator circuit configured to process the pyramid images and the keypoints for keypoint descriptor generation of keypoints; and
a pyramid image buffer circuit configured to store different portions of the pyramid images at different times for sending to the keypoint descriptor generator circuit for the keypoint descriptor generation; and
an RM buffer circuit configured to store different portions of the RM images generated at different times, for sending to the inter octave keypoint selector circuit for keypoint candidate determination.

19. The system of claim 18, wherein the pyramid image buffer circuit is further configured to:
provide first portions of the pyramid images stored in memory locations of the pyramid image buffer circuit to the keypoint descriptor generator circuit for the keypoint descriptor generation;
remove the first portions of the pyramid images from the memory locations responsive to the first portions being no longer needed for the keypoint descriptor generation by the keypoint descriptor generator circuit; and
store second portions of the pyramid images that are needed for the keypoint descriptor generation by the keypoint descriptor generator circuit in the memory locations that previously stored the first portions of the pyramid images.

20. An apparatus, comprising:
a pyramid image generator circuit configured to generate an image pyramid from an input image, the image pyramid including pyramid images at different octaves and scales;
a response map (RM) generator circuit configured to generate RM images based on the pyramid images, the RM images comprising a first subset of RM images of a first octave of the different octaves and a second subset of RM images of a second octave of the different octaves;
an intra octave keypoint candidate selector circuit configured to determine keypoint candidates of keypoints of the input image based on a comparison between at least two RM images in the first subset of RM images of the first octave;
an inter octave keypoint selector circuit configured to determine keypoints from the keypoint candidates based on a comparison between the first subset of RM images and the second subset of RM images;
a keypoint descriptor generator circuit configured to process the pyramid images and the keypoints for keypoint descriptor generation of the keypoints;
a pyramid image buffer circuit configured to:
provide first portions of the pyramid images stored in memory locations of the pyramid image buffer circuit to the keypoint descriptor generator circuit for the keypoint descriptor generation;
remove the first portions of the pyramid images from the memory locations responsive to the first portions being no longer needed for the keypoint descriptor generation by the keypoint descriptor generator circuit; and
store second portions of the pyramid images that are needed for the keypoint descriptor generation by the keypoint descriptor generator circuit in the memory locations that previously stored the first portions of the pyramid images; and
an RM buffer circuit configured to store different portions of the RM images generated at different times, for sending to the inter octave keypoint selector circuit for keypoint candidate determination.

* * * * *

UNITED STATES PATENT AND TRADEMARK OFFICE
CERTIFICATE OF CORRECTION

Page 1 of 2

PATENT NO. : 11,968,471 B2
APPLICATION NO. : 17/195520
DATED : April 23, 2024
INVENTOR(S) : Pope et al.

It is certified that error appears in the above-identified patent and that said Letters Patent is hereby corrected as shown below:

On the Title Page

Column 2, Item (74), in "Attorney, Agent or Firm", Line 2, delete "Fox," and insert -- Fox --, therefor.

In the Specification

In Column 11, Line 57, delete "YCrCb" and insert -- YCbCr --, therefor.

In Column 14, Line 6, delete "a" and insert -- an --, therefor.

In Column 15, Line 12, delete "turned off" and insert -- turned off. --, therefor.

In Column 23, Line 5, delete "n+1th" and insert -- $n+1^{th}$ --, therefor.

In Column 23, Line 6, delete "n+1th" and insert -- $n+1^{th}$ --, therefor.

In Column 24, Lines 9-10, delete "<DeterminanTestThreshold." and insert
-- <DeterminantTestThreshold. --, therefor.

In the Claims

In Column 32, Claim 1, Line 11, delete "generation," and insert -- generation; --, therefor.

In Column 32, Claim 2, Line 17, delete "wherein," and insert -- wherein --, therefor.

In Column 32, Claim 2, Line 18, delete "stores" and insert -- store --, therefor.

In Column 33, Claim 9, Line 10, delete "wherein," and insert -- wherein --, therefor.

Signed and Sealed this
Fourth Day of June, 2024

Katherine Kelly Vidal
*Director of the United States Patent and Trademark Office*

In Column 33, Claim 12, Line 26, delete "determines" and insert -- determine --, therefor.